US012359055B2

(12) United States Patent
Senda et al.

(10) Patent No.: US 12,359,055 B2
(45) Date of Patent: Jul. 15, 2025

(54) RESIN COMPOSITION, METHOD FOR PRODUCING RESIN COMPOSITION, AND MOLDED ARTICLE

(71) Applicant: KURARAY CO., LTD., Kurashiki (JP)

(72) Inventors: Yasushi Senda, Kamisu (JP); Masahiro Kato, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 761 days.

(21) Appl. No.: 17/612,039

(22) PCT Filed: May 22, 2020

(86) PCT No.: PCT/JP2020/020207
§ 371 (c)(1),
(2) Date: Nov. 17, 2021

(87) PCT Pub. No.: WO2020/235662
PCT Pub. Date: Nov. 26, 2020

(65) Prior Publication Data
US 2022/0235217 A1     Jul. 28, 2022

(30) Foreign Application Priority Data

May 22, 2019   (JP) ................................. 2019-096401
Dec. 27, 2019   (JP) ................................. 2019-238592

(51) Int. Cl.
*C08L 53/02*          (2006.01)
(52) U.S. Cl.
CPC ........... *C08L 53/02* (2013.01); *C08L 2205/03* (2013.01); *C08L 2207/53* (2013.01)
(58) Field of Classification Search
CPC ............................. C08L 53/02; C08L 2205/03
See application file for complete search history.

(56) References Cited

U.S. PATENT DOCUMENTS 5,306,779 A      4/1994   Shibata et al.
5,710,212 A *    1/1998   Asano ..................... C08L 77/00
                                                               525/905

(Continued)

FOREIGN PATENT DOCUMENTS

EP        0 384 208 A2      8/1990
EP        0 554 449 A1      8/1993
(Continued)

OTHER PUBLICATIONS

Burgoa, Polym Int, 2019, 68, p. 1130-1139 (Year: 2019).*

(Continued)

*Primary Examiner* — Robert C Boyle
(74) *Attorney, Agent, or Firm* — Oblon, McClelland, Maier & Neustadt, L.L.P.

(57) ABSTRACT

A resin composition or the like may exhibit high vibration damping properties even at a relatively high temperature, have good moldability, and have excellent impact resistance. The resin composition contains a thermoplastic resin (A), a thermoplastic resin (B), and a polar resin (C), wherein the resin composition satisfies (1) to (3): (1) the thermoplastic resin (B) has at least one of a reactive functional group and a monomer unit containing a hetero atom; (2) the thermoplastic resin (A) and the thermoplastic resin (B) are different types of resins; (3) with respect to the total mass of the resin composition, the content of the thermoplastic resin (A) is 1 to 30% by mass, the content of the thermoplastic resin (B) is 1 to 30% by mass, and the content of the polar resin (C) is 40 to 98% by mass.

17 Claims, 2 Drawing Sheets

(56) References Cited

U.S. PATENT DOCUMENTS

| | | | |
|---|---|---|---|
| 5,760,105 A | 6/1998 | Okada et al. | |
| 6,111,016 A * | 8/2000 | Katayama | C08L 69/00 |
| | | | 525/394 |
| 2009/0087607 A1 | 4/2009 | Noda et al. | |
| 2010/0010107 A1 | 1/2010 | Sugimae et al. | |
| 2011/0003928 A1 * | 1/2011 | Shimizu | C08L 77/00 |
| | | | 524/502 |
| 2013/0131271 A1 | 5/2013 | Yokogi et al. | |
| 2017/0313856 A1 * | 11/2017 | Oda | C08K 7/02 |

FOREIGN PATENT DOCUMENTS

| | | |
|---|---|---|
| EP | 2 065 456 A1 | 6/2009 |
| EP | 2 239 299 A1 | 10/2010 |
| JP | 7-48487 A | 2/1995 |
| JP | 9-12872 A | 1/1997 |
| JP | 9-31324 A | 2/1997 |
| JP | 10-182925 A | 7/1998 |
| JP | 2002-284830 A | 10/2002 |
| JP | 2006-117879 A | 5/2006 |
| JP | 2006-282727 A | 10/2006 |
| JP | 2010-53319 A | 3/2010 |
| JP | 2012-214666 A | 11/2012 |
| JP | 2013-147648 A | 8/2013 |
| JP | 2018-30349 A | 3/2018 |
| JP | 2019-59831 A | 4/2019 |
| WO | WO 00/15680 A1 | 3/2000 |
| WO | WO 2017/094738 A1 | 6/2017 |
| WO | WO 2019/103048 A1 | 5/2019 |

OTHER PUBLICATIONS

Extended European Search Report issued May 22, 2023, in corresponding European Patent Application No. 20810168.3, 7 pages.
International Search Report mailed on Jul. 21, 2020 in PCT/JP2020/020207 filed on May 22, 2020, 3 pages).

* cited by examiner

US 12,359,055 B2

RESIN COMPOSITION, METHOD FOR PRODUCING RESIN COMPOSITION, AND MOLDED ARTICLE

CROSS-REFERENCE TO RELATED APPLICATIONS

The present application is the national stage of international application PCT/JP2020/020207, filed on May 22, 2020, and claims the benefit of the filing date of Japanese Appl. No. 2019-096401 and 2019-238592, respectively filed on May 22 and Dec. 27, 2019.

TECHNICAL FIELD

The present invention relates to a resin composition, a method for producing the resin composition, and a molded article.

BACKGROUND ART

It is already known that some of block copolymers having a polymer block containing a structural unit derived from an aromatic vinyl compound and a polymer block containing a structural unit derived from a conjugated diene compound and hydrogenated products thereof have vibration damping properties, and they have been used as vibration damping materials. In addition to the vibration damping properties, some of the above-mentioned block copolymers and hydrogenated products thereof can have physical properties such as sound insulation properties, heat resistance, impact resistance, and pressure-sensitive adhesive properties, and it is conceivable that they may be used in various applications.

For example, there has been disclosed a hydrogenated block copolymer of a styrene-based compound and a conjugated diene compound such as isoprene or butadiene, in which the peak temperature of tan δ and the vinyl bond amount are specified in order to improve mechanical properties such as vibration damping properties, flexibility, heat resistance, tensile strength, and impact resistance (for example, see PTLs 1 to 4).

The vibration damping properties of the polyamide resin can be enhanced by adding the hydrogenated block copolymer to the polyamide resin, for example.

In addition, PTL 5 describes that a mixed resin obtained by melt-mixing a polyamide resin and a compatibilizer is melt-mixed with a polyolefin resin.

Further, PTL 6 describes a modifier which is blended with a polyolefin resin and improves impact resistance of a molded body. It is described that the modifier contains a dispersed phase dispersed in a continuous phase of a polyolefin resin, and the dispersed phase contains a polyamide resin and a modified elastomer.

CITATION LIST

Patent Literature

PTL 1: JP 2002-284830 A
PTL 2: WO2000/015680
PTL 3: JP 2006-117879 A
PTL 4: JP 2010-053319 A
PTL 5: JP 2013-147648 A
PTL 6: WO2017/094738

SUMMARY OF INVENTION

Technical Problem

The above-described hydrogenated block copolymer may be added to a polar resin such as a polyamide resin. The addition of the hydrogenated block copolymer may invite a problem in that processability, moldability, mechanical properties, and the polar resin to which the hydrogenated block copolymer is added are likely to decrease due to low compatibility of the hydrogenated block copolymer with the polar resin.

The above-mentioned PTLs 5 and 6 are techniques for improving the compatibility between a polyamide resin and a polyolefin resin. However, the techniques described in both documents have a main object of improving impact resistance, and no studies have been made on improving vibration damping properties. Therefore, sufficient vibration damping properties are not provided, and further improvement is necessary in order to achieve both vibration damping properties and moldability while providing impact resistance.

Accordingly, an object of the present invention is to provide a resin composition which exhibits high vibration damping properties even at relatively high temperatures, has good moldability, and is excellent in impact resistance.

Solution to Problem

As a result of intensive studies to solve the above-described problems, the present inventors have conceived the following invention and found it enables to solve the problems.

That is, the present invention is as follows.

[1] A resin composition containing a thermoplastic resin (A), a thermoplastic resin (B), and a polar resin (C), wherein the resin composition satisfies the following conditions (1) to (3):
  (1) the thermoplastic resin (B) has at least one of a reactive functional group and a monomer unit containing a hetero atom;
  (2) the thermoplastic resin (A) and the thermoplastic resin (B) are different types of resins;
  (3) with respect to the total mass of the resin composition, the content of the thermoplastic resin (A) is 1 to 30% by mass, the content of the thermoplastic resin (B) is 1 to 30% by mass, and the content of the polar resin (C) is 40 to 98% by mass.

[2] An automotive member containing the above-mentioned resin composition.

[3] A molded article of a resin composition containing a thermoplastic resin (A), a thermoplastic resin (B), and a polar resin (C), wherein the resin composition satisfies the above conditions (1) to (3), and the molded article has a core-shell structure wherein the thermoplastic resin (A) and the thermoplastic resin (B) are dispersed in the polar resin (C), and a dispersion diameter D(A) of the thermoplastic resin (A) and a dispersion diameter D(B) of the thermoplastic resin (B) satisfy a relationship D(A)<D(B).

[4] A method for producing the above-mentioned resin composition, including preparing a mixture of the thermoplastic resin (A) and the thermoplastic resin (B) in a molten state, and mixing the mixture with the polar resin (C).

[5] A method for producing a resin modifier containing a thermoplastic resin (A) and a thermoplastic resin (B), the method including adding a radical initiator to a mixture in a molten state of the thermoplastic resin (A) and a precursor (B0) of the thermoplastic resin (B) satisfying the following conditions (4) and (5) to introduce a reactive functional group into the precursor (B0) to obtain the thermoplastic resin (A) and the thermoplastic resin (B) having the reactive functional group:

(4) the thermoplastic resin (A) is a block copolymer having a block (A-1) containing more than 70 mol % of an aromatic vinyl monomer unit and a block (A-2) containing 30 mol % or more of a conjugated diene monomer, or a hydrogenated product thereof, and has a glass transition temperature in the range of −30 to +50° C.;

(5) the precursor (B0) of the thermoplastic resin (B) has a glass transition temperature in the range of −100 to −31° C.

Advantageous Effects of Invention

The present invention enables to provide a resin composition which exhibits high vibration damping properties even at a relatively high temperature, has good moldability, and is excellent in impact resistance.

DESCRIPTION OF EMBODIMENTS

Figure 1:
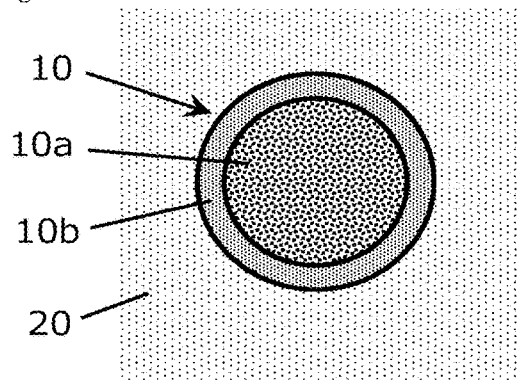
FIG. 1 is a schematic cross-sectional view showing an example of a core-shell structure.

In the description herein, preferable definitions can be arbitrarily selected, and a combination of preferable definitions is more preferable.

In the description herein, the expression "XX to YY" means "XX or more and YY or less".

In the description herein, with respect to a preferable numerical range (for example, a range of a content or the like), a lower limit value and an upper limit value described stepwise can be independently combined. For example, from the description of "preferably 10 to 90, and more preferably 30 to 60", "10 to 60" can be obtained by combining "a preferred lower limit value (10)" and "a preferred upper limit value (60)".

In the description herein, "~ unit" (here, "~" indicates a monomer) means "a constituent unit derived from ~", and for example, "propylene unit" means "a constituent unit derived from propylene".

In the description herein, for example, "(meth)acrylic acid" indicates both "acrylic acid" and "methacrylic acid", and other similar terms are the same.

In the description herein, the weight average molecular weight is a weight average molecular weight in terms of standard polystyrene obtained by gel permeation chromatography (GPC) measurement.

[Resin Composition]

A resin composition according to an embodiment of the present invention (hereinafter, may be referred to as a resin composition of the present embodiment) is a resin composition containing a thermoplastic resin (A), a thermoplastic resin (B), and a polar resin (C), and satisfies the following conditions (1) to (3):

(1) the thermoplastic resin (B) has at least one of a reactive functional group and a monomer unit containing a hetero atom;

(2) the thermoplastic resin (A) and the thermoplastic resin (B) are different types of resins;

(3) with respect to the total mass of the resin composition, the content of the thermoplastic resin (A) is 1 to 30% by mass, the content of the thermoplastic resin (B) is 1 to 30% by mass, and the content of the polar resin (C) is 40 to 98% by mass.

By using a thermoplastic resin (B) having at least one of a reactive functional group and a monomer unit containing a hetero atom, which is highly compatible with a polar resin (C), the thermoplastic resin (B) acts as a kind of compatibilizer to form a core-shell structure in which the thermoplastic resin (B) serves as a shell and a thermoplastic resin (A) which is a different type of resin from the thermoplastic resin (B) serves as a core. As a result, it becomes easier to disperse even a thermoplastic resin (A) that is not readily compatible with the polar resin (C) as it is into the matrix of the polar resin (C).

As a result of the improvement in compatibility between the polar resin (C) and the thermoplastic resin (A), the effect of improving the properties derived from the thermoplastic resin (B) and the thermoplastic resin (A) is likely to appear, and by selecting a resin suitable for improving impact resistance as the thermoplastic resin (B) and a resin suitable for improving vibration damping properties as the thermoplastic resin (A), it is considered possible to improve impact resistance and vibration damping properties while maintaining moldability.

A preferred aspect of the resin composition is a resin composition, wherein a molded article of the resin composition has a core-shell structure wherein the thermoplastic resin (A) and the thermoplastic resin (B) are dispersed in the polar resin (C), and a dispersion diameter D(A) of the thermoplastic resin (A) and a dispersion diameter D(B) of the thermoplastic resin (B) satisfy a relationship D(A)<D(B).

Hereinafter, each component contained in the resin composition of the present embodiment will be described. Subsequently, a core-shell structure, a production method, applications, and the like will be sequentially described.

<Thermoplastic Resin (A)>

As defined in the condition (2) described above, the thermoplastic resin (A) is a different type of resin from the thermoplastic resin (B). In the description herein, "a different type of resin" means that at least one is different among the chemical structure and the weight average molecular weight of the monomer constituting the resin, and in the case of having a plurality of monomer units, the ratios and polymerization forms of the respective monomers. The aspect of "a different type of resin" includes an aspect in which the thermoplastic resin (B) has at least one of a reactive functional group and a monomer unit containing a hetero atom, and the thermoplastic resin (A) does not have any of the reactive functional group and the monomer unit containing a hetero atom.

The thermoplastic resin (A) having no reactive functional group is preferable from the viewpoint of production cost. More specifically, the thermoplastic resin (A) preferably does not have an alkoxysilyl group, a carboxy group, an amino group, a hydroxy group, an epoxy group, a group derived from an acid anhydride, an ester group, a mercapto group, and an oxazoline group.

The thermoplastic resin (A) is preferably a block copolymer containing a polymer block (A-1) mainly containing a structural unit derived from an aromatic vinyl compound (hereinafter sometimes abbreviated as "aromatic vinyl compound unit") and a polymer block (A-2) mainly containing a structural unit derived from a conjugated diene compound (hereinafter sometimes abbreviated as "conjugated diene unit"), or a hydrogenated product thereof, from the viewpoint of mechanical properties such as vibration clamping properties and impact resistance. The term "mainly" as used herein means that the structural unit derived from an aromatic vinyl compound is contained in the polymer block (A) in an amount of more than 50% by mass, and that the structural unit derived from a conjugated diene compound is contained in the polymer block (B) in an amount of more than 50% by mass.

From the viewpoint of further enhancing mechanical properties such as vibration damping properties and impact resistance, a block copolymer having a block (A-1) containing more than 70 mol % of an aromatic vinyl monomer unit and a block (A-2) containing 30 mol % or more of a conjugated diene monomer unit, or a hydrogenated product thereof is preferable.

The amount of the aromatic vinyl compound unit in the polymer block (A-1) is more preferably 80 mol % or more, still more preferably 90 mol % or more, yet still more preferably 95 mol % or more, and particularly preferably substantially 100 mol %. In other words, the aromatic vinyl compound unit in the polymer block (A-1) is preferably 80 to 100 mol %.

The amount of the conjugated diene unit in the polymer block (A-2) is preferably 50 mol % or more, more preferably 70 mol % or more, still more preferably 90 mol % or more, and particularly preferably substantially 100 mol %, from the viewpoint of developing excellent vibration damping properties. In other words, the conjugated diene unit in the polymer block (A-2) is preferably 50 to 100 mol %.

The thermoplastic resin (A) is more preferably a hydrogenated product of a block copolymer having the polymer block (A-1) and the polymer block (A-2), and the hydrogenation rate of the hydrogenated product is 50 to 99 mol %.

The glass transition temperature of the thermoplastic resin (A) is preferably in the range of −30 to +50° C., more preferably in the range of −25 to +30° C., and still more preferably in the range of −20 to +20° C.

In the description herein, the glass transition temperature is a value measured using a differential scanning calorimeter (DSC) measurement apparatus.

The thermoplastic resin (A) preferably has a structure represented by the following formula (X) or a structure of a hydrogenated product thereof.

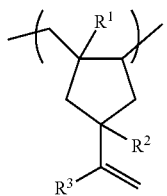

(X)

In the formula (X), $R^1$ to $R^3$ each independently represent a hydrogen atom or a hydrocarbon group having 1 to 11 carbon atoms, and a plurality of $R^1$ to $R^3$ may be the same or different.

When the block copolymer or the hydrogenated product thereof is used as the thermoplastic resin (A), the alicyclic skeleton (X) is preferably contained in a polymer block containing a structural unit derived from a conjugated diene compound, which is a constituent element of the block copolymer or the hydrogenated product thereof. Details of the alicyclic skeleton (X) will be described later.

It is preferable that the thermoplastic resin (A) does not have a reactive functional group or a monomer unit containing a hetero atom, which the thermoplastic resin (B) may have and which will be described later.

Details of the block copolymer or hydrogenated product thereof used as the thermoplastic resin (A) will be described later.

<Thermoplastic Resin (B)>

As defined in the above-described condition (1), the thermoplastic resin (B) has at least one of a reactive functional group and a monomer unit containing a hetero atom. Further, as defined in the above-described condition (2), the thermoplastic resin (B) is a different type of resin from the thermoplastic resin (A).

The reactive functional group that the thermoplastic resin (B) may have is a functional group capable of relatively easily forming a bond by a chemical reaction with another functional group.

Examples of the reactive functional group include an alkoxysilyl group, a carboxy group, an amino group, a hydroxy group, an epoxy group, a group derived from an acid anhydride, an ester group, a mercapto group, and an oxazoline group. Two or more of these may be included. Preferred are one or two or more functional groups selected from the group consisting of an alkoxysilyl group, a carboxy group, an amino group, a hydroxy group, an epoxy group, a group derived from an acid anhydride, an ester group, and an oxazoline group. Particularly preferred as the reactive functional group is a group derived from at least one selected from the group consisting of maleic anhydride and an alkoxysilyl group, from the viewpoint of facilitating the extrusion reaction to be suitable for industrialization. Here, the "group derived from maleic anhydride" is a group having a structure in which one of carbons constituting a double bond of a ring of maleic anhydride serves as a bond.

Examples of the monomer unit containing a hetero atom include a monomer unit such as hexamethylenediamine containing an amino group containing a nitrogen atom, a monomer unit such as terephthalic acid containing a carboxy group containing an oxygen atom, and a monomer unit such as sodium sulfide containing a sulfur atom. Two or more of these may be included.

The thermoplastic resin (B) is preferably a modified product obtained by modifying a block copolymer having a polymer block (B-1) derived from an aromatic vinyl compound and a polymer block (B-2) derived from a conjugated diene compound or a hydrogenated product thereof with a compound having the reactive functional group, or a modified product obtained by modifying an olefin-based resin with a compound having the reactive functional group. In the former case, a modified product obtained by modifying a block copolymer having a block (B-1) containing more than 70 mol % of an aromatic vinyl monomer unit and a block (B-2) containing 30 mol % or more of a conjugated diene monomer or a hydrogenated product thereof with a compound having the reactive functional group is more preferable.

Details of the block copolymer or the hydrogenated product thereof used for obtaining the thermoplastic resin (B) will be described later.

Examples of the olefin-based resin used for obtaining the thermoplastic resin (B) include polyethylenes such as high density polyethylene, medium density polyethylene, low density polyethylene, and linear low density polyethylene; polypropylenes (PP) such as homopolypropylene, block polypropylene, and random polypropylene; homopolymers or copolymers of α-olefins; and copolymers of propylene and/or ethylene with α-olefins. Examples of the α-olefin include α-olefins having 20 or less carbon atoms, such as 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene, and one or two or more of these can be used.

When an olefin-based resin is used as the thermoplastic resin (B), it is preferable to use a modified olefin resin which is a modified product obtained by modifying the olefin resin with maleic acid or the like.

Preferred examples of the thermoplastic resin (B) having a reactive functional group include epoxy group-containing resins such as epoxy group-containing ethylene-based copolymers, epoxidized products of diene-based polymers, epoxy group-containing graft copolymers, epoxy group-containing acrylic copolymers, and epoxy group-containing styrene-based copolymers; and oxazoline group-containing compounds such as oxazoline group-containing styrene-based copolymers. The employment of the epoxy group-containing resin as the thermoplastic resin (B) enables to easily disperse the polar resin (C) in the thermoplastic resin (A) generally in a small amount as compared with other thermoplastic resins (B). When the thermoplastic resin (B) different from the epoxy group-containing resin is used, the amount used tends to be large, but the thermoplastic resin (B) is easily uniformly dispersed in the resin composition, and there is an advantage that the feed amount is easily stabilized when continuous production such as extrusion molding is carried out.

(Epoxy Group-Containing Ethylene-Based Copolymer)

The epoxy group-containing ethylene-based copolymer is a copolymer containing a structural unit derived from ethylene and a structural unit derived from glycidyl methacrylate.

The content of the structural unit derived from glycidyl methacrylate in the epoxy group-containing ethylene-based copolymer is not particularly limited, but is preferably 3 to 30% by mass, more preferably 5 to 25% by mass, and particularly preferably 10 to 20% by mass when the mass of the copolymer is taken as 100% by mass, from the viewpoint of a compatibilizing effect.

The content of the structural unit derived from glycidyl methacrylate is measured by infrared spectroscopy.

The epoxy group-containing ethylene-based copolymer may be an epoxy group-containing ethylene-based copolymer composed only of a structural unit derived from ethylene and a structural unit derived from glycidyl methacrylate, or an epoxy group-containing ethylene-based copolymer containing a structural unit derived from ethylene and a structural unit derived from glycidyl methacrylate, and further containing a structural unit derived from one or more compounds selected from a compound represented by the following formula (1) and a compound represented by the following formula (2).

(1)

(2)

In the formulas, $R^4$ represents a hydrogen atom or an alkyl group having 1 to 8 carbon atoms; $R^5$ represents a halogen atom or a group represented by —$COOR^8$ ($R^8$ represents an alkyl group having 1 to 8 carbon atoms); $R^6$ represents a hydrogen atom, an alkyl group having 1 to 8 carbon atoms, or a group represented by —$COOR^9$ ($R^9$ represents an alkyl group having 1 to 8 carbon atoms); $R^7$ represents an alkylnitrile having 1 to 8 carbon atoms, an alkylether group, an alkylamide, a halogen atom, a phenyl group, or a group represented by —$COOR^{10}$ ($R^{10}$ represents an alkyl group having 1 to 8 carbon atoms or $R^{10}$ represents a group represented by —$OCOR^{11}$ ($R^{11}$ represents an alkyl group having 1 to 8 carbon atoms)).

Examples of the compound represented by the formula (1) include propylene, 1-butene, vinyl acetate, acrylic acid, methacrylic acid, methyl acrylate, ethyl acrylate, methyl methacrylate, ethyl methacrylate, vinyl chloride, vinylidene chloride, styrene, acrylonitrile, isobutyl vinyl ether, and acrylamide. These may be used alone, or two or more kinds thereof may be used. Among these, vinyl acetate, methyl acrylate, and methyl methacrylate are preferable.

Examples of the compound represented by the formula (2) include dimethyl maleate, diethyl maleate, dimethyl fumarate, and diethyl fumarate.

When the epoxy group-containing ethylene-based copolymer is composed of a structural unit derived from ethylene, a structural unit derived from glycidyl methacrylate, and a structural unit derived from a compound represented by the formula (1) or the formula (2), the content of the monomer unit derived from the compound represented by the formula (1) or the formula (2) is not particularly limited, but is preferably 40% by mass or less, and more preferably 30% by mass or less when the mass of the copolymer is taken as 100% by mass. In addition, in the above case, the content of the monomer unit derived from glycidyl methacrylate is not particularly limited, but is preferably 2 to 20% by mass, more preferably 3 to 10% by mass, and particularly preferably 5 to 7% by mass when the mass of the copolymer is taken as 100% by mass.

Examples of the epoxy group-containing ethylene-based copolymer include an ethylene-glycidyl methacrylate copolymer, an ethylene-propylene-glycidyl methacrylate copolymer, an ethylene-butene-1-glycidyl methacrylate copolymer, an ethylene-vinyl acetate-glycidyl methacrylate copolymer, an ethylene-acrylic acid-glycidyl methacrylate copolymer, an ethylene-methacrylic acid-glycidyl methacrylate copolymer, an ethylene-methyl acrylate-glycidyl methacrylate copolymer, an ethylene-ethyl acrylate-glycidyl methacrylate copolymer, an ethylene-methyl methacrylate-glycidyl methacrylate copolymer, an ethylene-ethyl methacrylate-glycidyl methacrylate copolymer, an ethylene-methyl maleate-glycidyl methacrylate copolymer, an ethylene-ethyl maleate-glycidyl methacrylate copolymer, an ethylene-methyl fumarate-glycidyl methacrylate copolymer, an ethylene-ethyl fumarate-glycidyl methacrylate copolymer, an ethylene-vinyl chloride-glycidyl methacrylate copolymer, an ethylene-vinylidene chloride-glycidyl methacrylate copolymer, an ethylene-styrene-glycidyl methacrylate copolymer, an ethylene-acrylonitrile-glycidyl methacrylate copolymer, an ethylene-isobutyl vinyl ether-glycidyl methacrylate copolymer, and an ethylene-acrylamide-glycidyl methacrylate copolymer.

These may be used alone, or two or more kinds thereof may be used. Among these, an ethylene-glycidyl methacrylate copolymer (for example, Bondfast BF-E manufactured by Sumitomo Chemical Co., Ltd., ethylene unit: 88% by mass, glycidyl methacrylate unit: 12% by mass) and an ethylene-methyl acrylate-glycidyl methacrylate copolymer (for example, Bondfast BF-7M manufactured by Sumitomo Chemical Co., Ltd., ethylene unit: 67% by mass, glycidyl methacrylate unit: 6% by mass, methyl acrylate unit: 27% by mass) are preferable.

The epoxy group-containing ethylene-based copolymer can be synthesized by various methods. For example, it can be produced by bulk polymerization, emulsion polymerization, solution polymerization or the like using a free radical initiator.

Typical polymerization methods include methods described in JP 48-11388 A and JP 61-127709 A, and a method of copolymerizing under conditions of a pressure of 500 kg/cm$^2$ or higher and a temperature of 40 to 300° C. under the presence of a polymerization initiator that generates free radicals.

Typical polymerization methods also include a method in which an unsaturated epoxy compound and a radical generator are mixed with a polymer containing a structural unit derived from ethylene and optionally a structural unit derived from a compound represented by the formula (1) or the formula (2), and the mixture is subjected to melt graft copolymerization in an extruder, or a method in which ethylene, an unsaturated epoxy compound, and optionally a compound represented by the formula (1) or the formula (2) are copolymerized in an inert medium such as water or an organic solvent in the presence of a radical generator.

(Epoxidized Product of Diene-Based Polymer)

The epoxidized product of the diene-based polymer is a polymer in which an epoxy group is introduced into the molecule by epoxidizing the diene-based polymer with an epoxidizing agent.

Examples of the diene-based polymer used in the epoxidized product of the diene-based polymer include a butadiene polymer, a styrene-butadiene copolymer, an isoprene polymer, a styrene-isoprene copolymer, and an acrylonitrile-butadiene copolymer. These may be used alone, or two or more kinds thereof may be used. Among these, an epoxidized product of a styrene-butadiene block copolymer using a styrene-butadiene copolymer is particularly preferable from the viewpoint of improving compatibility.

Examples of the epoxidized product of a styrene-butadiene block copolymer include epoxidized products of styrene-butadiene block copolymers represented by the following general formula (3) or the following general formula (4).

styrene and a structural unit derived from an oxazoline group-containing olefin such as isopropenyloxazoline.

The content of the structural unit derived from an oxazoline group-containing olefin in the oxazoline group-containing styrene-based copolymer is not particularly limited, but is preferably 2 to 50% by mass, more preferably 10 to 45% by mass, and particularly preferably 15 to 40% by mass when the mass of the copolymer is taken as 100% by mass, from the viewpoint of a compatibilizing effect.

The total content of the structural unit derived from styrene and the structural unit derived from an oxazoline group-containing olefin with respect to the total mass of the oxazoline group-containing styrene-based copolymer is preferably 50 to 100% by mass, more preferably 70 to 100% by mass, still more preferably 85 to 100% by mass, and most preferably 100% by mass.

The presence or absence of a structural unit derived from an oxazoline group-containing olefin and the content thereof are measured by NMR.

Examples of commercially available products of the oxazoline group-containing styrene-based copolymer include Epocros RPS-1005 and PX-3-RP-5 manufactured by Nippon Shokubai Co., Ltd., which are copolymers of styrene and 2-isopropenyl-2-oxazoline.

(Epoxy Group-Containing Graft Copolymer)

The epoxy group-containing graft copolymer is a graft copolymer in which a polymer having an epoxy group is introduced as a side chain into a main chain derived from a polyolefin or an acrylonitrile-styrene copolymer.

The mass ratio of the portion derived from the epoxy group-containing polymer in the epoxy group-containing graft copolymer is not particularly limited, but is preferably 1 to 50% by mass, more preferably 3 to 40% by mass, and particularly preferably 5 to 30% by mass when the mass of the graft copolymer is taken as 100% by mass, from the viewpoint of easily ensuring good compatibility.

The presence or absence of the epoxy group-containing polymer portion and the content thereof in the epoxy group-containing graft copolymer are measured by NMR.

Examples of commercially available products of the epoxy group-containing graft copolymer include Modiper A4000 series such as Modiper A4100, A4300, and A4400 manufactured by NOF Corporation, which are graft copo-

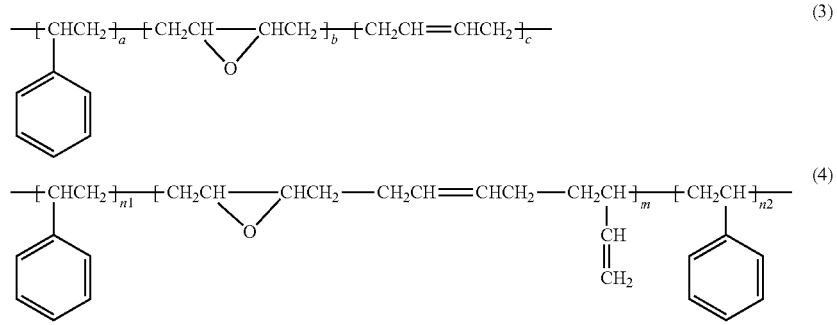

Examples of commercially available epoxidized products of styrene-butadiene block copolymers include Epofriend AT501 and Epofriend CT310 manufactured by Daicel Corporation.

(Oxazoline Group-Containing Styrene-Based Copolymer)

The oxazoline group-containing styrene-based copolymer is a copolymer containing a structural unit derived from lymers having a polyolefin as the main chain and a vinyl-based polymer such as polystyrene as the side chain.

(Epoxy Group-Containing Acrylic Copolymer, Epoxy Group-Containing Styrene-Based Copolymer)

The epoxy group-containing acrylic copolymer is a copolymer of a polymerizable unsaturated compound having an epoxy group and an acrylic polymerizable unsaturated compound. Further, the epoxy group-containing styrene-based copolymer is a copolymer of a polymerizable unsaturated compound having an epoxy group and a styrene-based polymerizable unsaturated compound.

The content of the structural unit derived from the polymerizable unsaturated compound having an epoxy group in the epoxy group-containing copolymer is not particularly limited, but is preferably 5 to 80% by mass, more preferably 10 to 70% by mass, and particularly preferably 20 to 60% by mass when the mass of the copolymer is taken as 100% by mass, from the viewpoint of a compatibilizing effect.

The presence or absence of the structural unit derived from a polymerizable unsaturated compound having an epoxy group and the content thereof are measured by NMR.

Examples of commercially available products of the epoxy group-containing acrylic copolymer or the epoxy group-containing styrene-based copolymer include Marproof G series such as Marproof (registered trademark) G-0105SA, G-0130SP, G-0150M, G-0250SP, and G-1005S manufactured by NOF Corporation.

<Polar Resin (C)>

The polar resin (C) refers to a resin having a polar group such as a carboxy group, a sulfonic acid group, a hydroxy group, or a cyano group, a resin having an ether bond, an ester bond, an amide bond, or a sulfide bond in the resin, a resin containing at least one of oxygen, nitrogen, sulfur, and halogen in the molecule, or the like, and is a resin in which polarization is electronically generated in the molecule and has thermoplasticity. The polar resin (C) is preferably a resin having a polar group such as a sulfonic acid group or a cyano group, a resin having an ether bond, an ester bond, an amide bond, or a sulfide bond in the resin, a resin containing at least one of oxygen, nitrogen, sulfur, and halogen in the molecule, or the like, and more preferably a resin containing a resin having at least one of an ether bond, an ester bond, and an amide bond in the resin.

Preferred is at least one selected from the group consisting of polyamide resins such as nylon 6, nylon 66, nylon 610, nylon 9, nylon 6/66, nylon 66/610, nylon 6/11, nylon 6/12, nylon 12, nylon 46, and amorphous nylons; polyester resins such as polyethylene terephthalate, polyethylene naphthalate, and polybutylene terephthalate; polyacetal resins such as polyoxymethylene homopolymers and polyoxymethylene copolymers; polyphenylene sulfide (PPS) resins, polyphenylene ether resins, polyarylate resins, polyether sulfone resins, epoxy resins, polyurethane resins, polyvinyl alcohol resins, polycarbonate resins, ethylene-vinyl acetate copolymers, ethylene-methacrylic acid copolymers, polyether ketones, polyether ether ketones, polyvinyl chloride, polyvinylidene chloride, polyacrylonitrile, vinylon, triacetyl cellulose, ABS resins, AS resins, ACS resins, xylene resins, acrylic resins, and polyester-based thermoplastic elastomers. More preferably, it is at least one selected from the group consisting of polyamide resins, polyester resins, polyacetal resins, polyphenylene sulfide resins, polyurethane resins, polyvinyl alcohol resins, polycarbonate resins, and polyester-based thermoplastic elastomers.

The polyester-based thermoplastic elastomer used as the polar resin (C) can be obtained, for example, by using (i) an aliphatic and/or alicyclic diol having 2 to 12 carbon atoms, (ii) an aromatic dicarboxylic acid or an alkyl ester thereof, and (iii) a polyalkylene ether glycol as raw materials, and subjecting an oligomer obtained by an esterification reaction or a transesterification reaction to a polycondensation reaction.

Examples of the commercially available polyester-based thermoplastic elastomer include Hytrel 3046 (registered trademark) manufactured by Du Pont-Toray Co., Ltd.

At least one of the glass transition temperature and the melting point of the polar resin (C) is preferably 80° C. or higher, more preferably 100° C. or higher, and still more preferably 150° C. or higher.

In the description herein, the melting point was measured with a DSC measuring apparatus.

When at least one of the glass transition temperature and the melting point is within the above range, the mechanical properties of the composition are improved.

<Resin Content Ratio>

As defined in the condition (3) described above, with respect to the total mass of the resin composition, the content of the thermoplastic resin (A) is 1 to 30% by mass, the content of the thermoplastic resin (B) is 1 to 30% by mass, and the content of the polar resin (C) is 40 to 98% by mass.

When the contents of the thermoplastic resin (A), the thermoplastic resin (B), and the polar resin (C) (hereinafter, may be referred to as resins (A) to (C)) are within the above ranges, a core-shell structure described below is likely to be dispersed in the polar resin (C) in a molded article of the resin composition.

From the viewpoint of further enhancing dispersibility, the content of the thermoplastic resin (A) is more preferably 2 to 20% by mass, the content of the thermoplastic resin (B) is more preferably 2 to 20% by mass, and the content of the polar resin (C) is more preferably 50 to 96% by mass, and the content of the thermoplastic resin (A) is still more preferably 3 to 15% by mass, the content of the thermoplastic resin (B) is still more preferably 2 to 15% by mass, and the content of the polar resin (C) is still more preferably 70 to 95% by mass.

The above-described epoxy group-containing resin used as the thermoplastic resin (B) enables to easily disperse the polar resin (C) in a small amount as compared with other thermoplastic resins (B).

When an epoxy group-containing resin is used as the thermoplastic resin (B), the content of the thermoplastic resin (A) is preferably 3 to 30% by mass, the content of the thermoplastic resin (B) is preferably 1 to 10% by mass, and the content of the polar resin (C) is preferably 60 to 96% by mass, the content of the thermoplastic resin (A) is more preferably 5 to 25% by mass, the content of the thermoplastic resin (B) is more preferably 1 to 8% by mass, and the content of the polar resin (C) is more preferably 67 to 94% by mass, and the content of the thermoplastic resin (A) is still more preferably 7 to 20% by mass, the content of the thermoplastic resin (B) is still more preferably 1 to 5% by mass, and the content of the polar resin (C) is still more preferably 75 to 92% by mass.

<Core-Shell Structure>

The resin composition has, in a molded product thereof, a core-shell structure wherein the thermoplastic resin (A) and the thermoplastic resin (B) are dispersed in the polar resin (C), and a dispersion diameter D(A) of the thermoplastic resin (A) and a dispersion diameter D(B) of the thermoplastic resin (B) satisfy a relationship D(A)<D(B).

Here, the dispersion diameter is a volume average dispersion diameter. The core-shell structure includes a structure in which one or a plurality of domains of the thermoplastic resin (A) are contained in a shell of the thermoplastic resin (B). In addition to these, a core-shell structure including one or a plurality of domains of the polar resin (C) in a shell of the thermoplastic resin (B) or a core-shell structure including a domain of the thermoplastic resin (A) and a domain of the polar resin (C) in a shell of the thermoplastic resin (B) may be included. As described above, the presence of the core-shell structure including a plurality of domains makes it easy to improve impact resistance.

FIG. 1 is a schematic cross-sectional view showing an example of a core-shell structure in a molded body of the resin composition according to the present embodiment. As shown in FIG. 1, a core-shell structure 10 is present in a matrix 20 of the polar resin (C). The core-shell structure 10 includes a core 10a of the thermoplastic resin (A) and a shell 10b of the thermoplastic resin (B).

Figure 2:
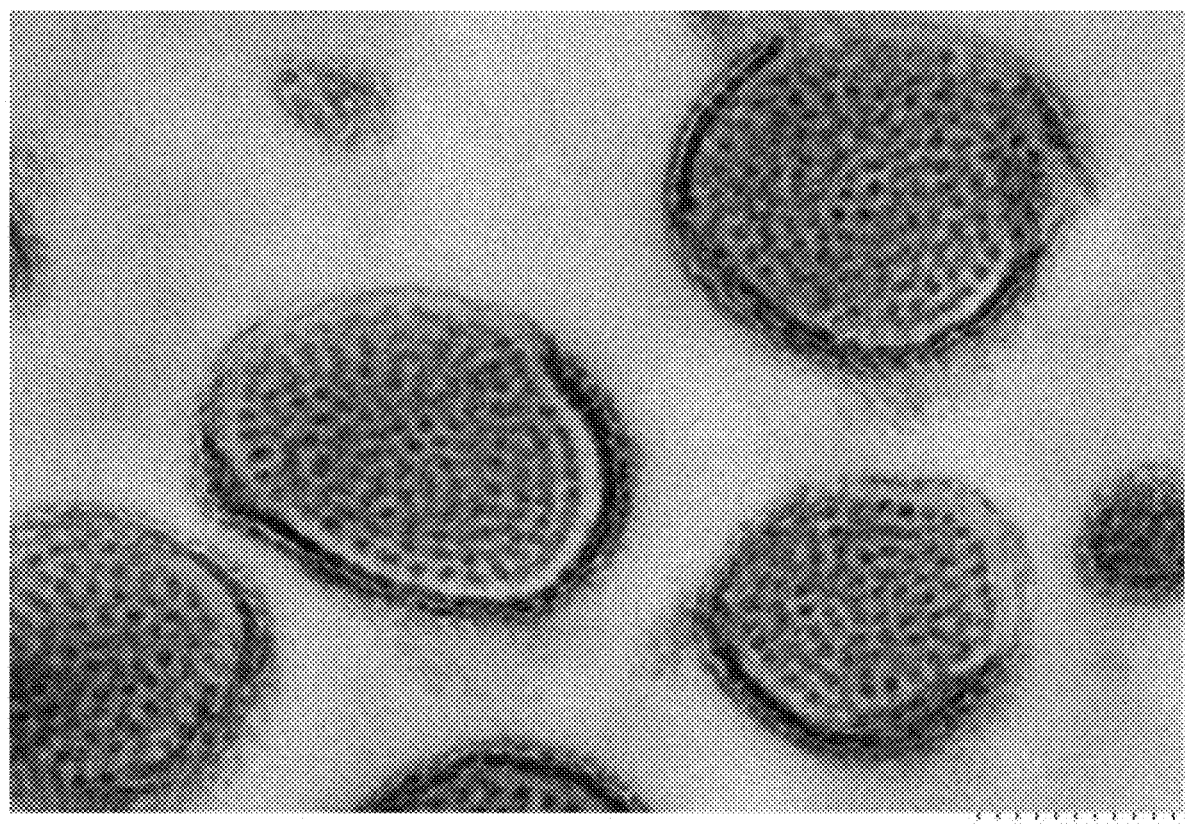
FIG. 2 is an enlarged cross-sectional photograph showing an example of a core-shell structure.

FIG. 2 is an enlarged cross-sectional photograph taken using a transmission electron microscope (TEM) showing an example of a core-shell structure having a configuration corresponding to FIG. 1. As shown in FIG. 2, a core-shell structure in which the thermoplastic resin (B) serves as a shell and the thermoplastic resin (A) serves as a core is formed in a matrix of the polar resin (C). A large number of dots inside the core are due to the fact that a specific portion of the thermoplastic resin (A) has been dyed.

Figure 3:
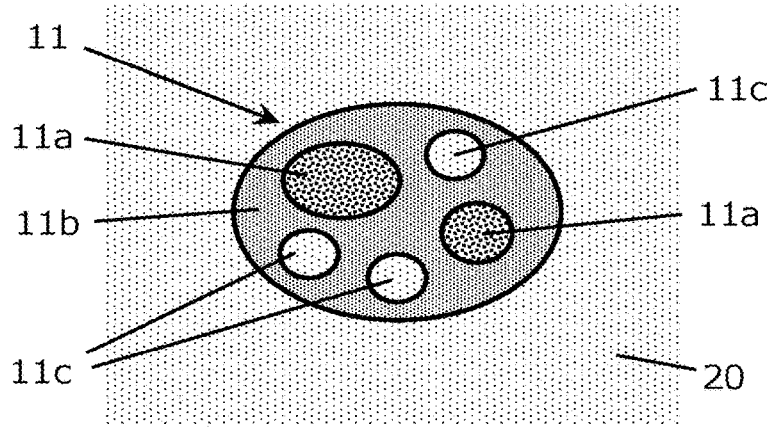
FIG. 3 is a schematic cross-sectional view showing another example of the core-shell structure.

FIG. 3 is a schematic cross-sectional view showing another example of the core-shell structure in the molded body of the resin composition according to the present embodiment. As shown in FIG. 3, a core-shell structure 11 includes a plurality of domains distributed in an island shape in a shell lib of the thermoplastic resin (B). The plurality of domains include a domain 11a of the thermoplastic resin (A) and a domain 11c of the polar resin (C).

Figure 4:
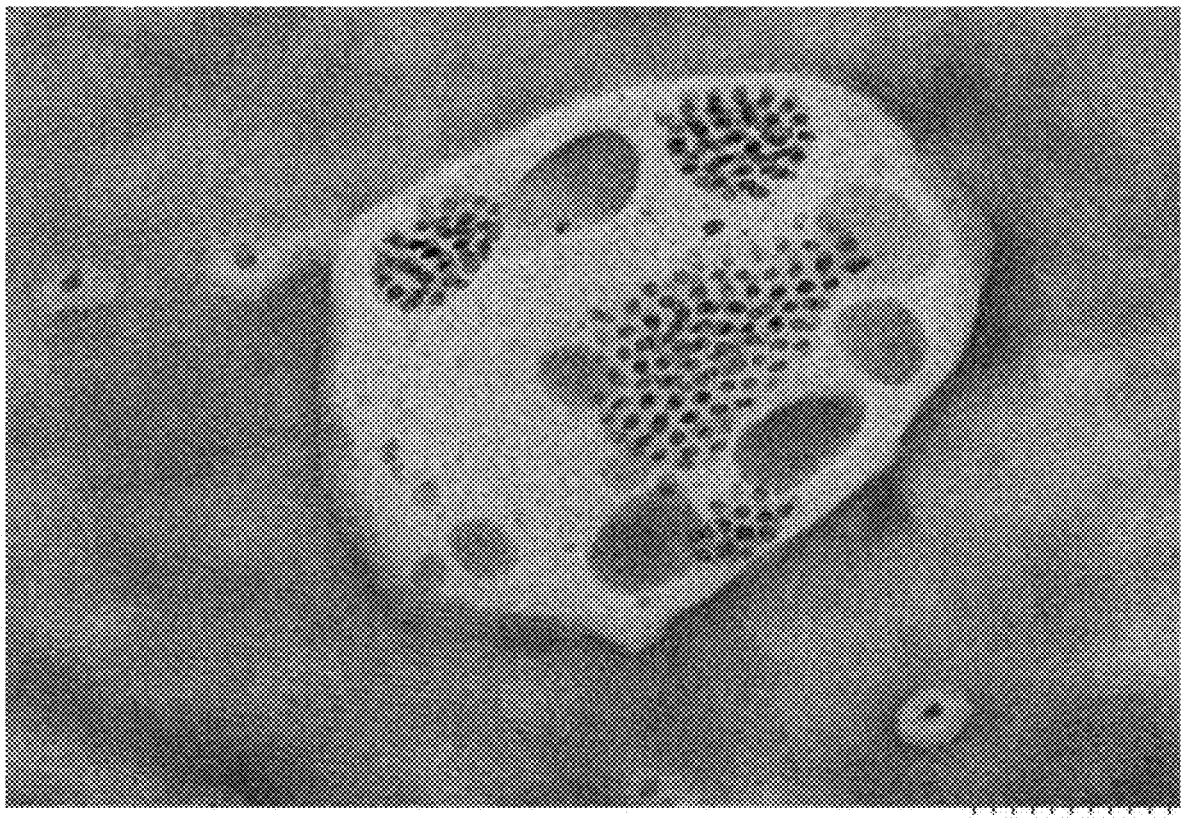
FIG. 4 is an enlarged cross-sectional photograph showing another example of the core-shell structure.

FIG. 4 is an enlarged cross-sectional photograph showing another example of the core-shell structure having a configuration corresponding to FIG. 3. As shown in FIG. 4, the core-shell structure includes a plurality of domains distributed in an island shape in the core, and in these domains, a plurality of domains of the thermoplastic resin (A) and a plurality of domains of the polar resin (C) are present in the shell of the thermoplastic resin (B).

The volume average dispersion diameter of the core-shell structure in the molded product of the resin composition is preferably 0.01 to 10 µm, more preferably 0.03 to 8 µm, and still more preferably 0.05 to 6 µm. The dispersion diameter D(B) of the thermoplastic resin (B) substantially coincides with the volume average dispersion diameter of the core-shell structure.

The dispersion diameter D(A) of the thermoplastic resin (A) is preferably 0.01 to 8 µm, more preferably 0.02 to 6 µm, and still more preferably 0.03 to 4 µm.

When the volume average dispersion diameter of the core-shell structure is within the above numerical range, the dispersibility of the core-shell structure in the polar resin (C) becomes improved, and the mechanical properties of the resin composition becomes improved.

When the core-shell structure is not a perfect circle such as an ellipse, the average of the measured values of the major axis is used as the volume-average dispersion diameter, and each of the dispersion diameter D(A) and the dispersion diameter D(B) is represented by the respective major axis. In addition, as shown in FIG. 3 and FIG. 4, when a plurality of domains of the thermoplastic resin (A) are present in the shell of the thermoplastic resin (B), D(A) is represented using the major axis of the domain of the thermoplastic resin (A) having the largest diameter.

<Additives>

The resin composition may contain various additives as long as the effects of the present invention are not impaired.

Examples of the additives include inorganic fillers such as talc, clay, mica, calcium silicate, glass, glass hollow sphere, glass fiber, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomaceous earth, alumina, titanium oxide, iron oxide, zinc oxide, magnesium oxide, tin oxide, antimony oxide, barium ferrite, strontium ferrite, carbon black, graphite, carbon fiber, activated carbon, carbon hollow sphere, calcium titanate, lead zirconate titanate, silicon carbide, and mica; and organic fillers such as wood powder and starch. Examples of the additives further include tackifier resins, plasticizers, fillers, crosslinking agents (isocyanate crosslinking agents, epoxy crosslinking agents, metal chelate crosslinking agents, aziridine crosslinking agents, amine resins, etc.), heat stabilizers, light stabilizers, ultraviolet absorbers, infrared absorbers, antioxidants, lubricants, colorants, antistatic agents, flame retardants, water repellents, waterproofing agents, hydrophilicity imparting agents, conductivity imparting agents, thermal conductivity imparting agents, electromagnetic wave shielding properties imparting agents, translucency adjusting agents, fluorescent agents, slidability imparting agents, transparency imparting agents, antiblocking agents, metal deactivators, antibacterial agents, crystal nucleating agents, crack inhibitors, ozone deterioration inhibitors, rat-proof agents, dispersants, viscosity improvers, light stabilizers, weather stabilizers, copper inhibitors, reinforcing agents, antifungal agents, and macrocyclic molecules (cyclodextrin, calixarene, cucurbituril, etc.).

These additives may be used alone, or in combination of two or more.

The content of the additive in the resin composition is not limited, and can be appropriately adjusted according to the type of the additive, the use of the resin composition, and the like. When the resin composition contains the additive, the content of the additive may be, for example, 50% by mass or less, 45% by mass or less, 30% by mass or less, 20% by mass or less, or 10% by mass or less, or may be 0.01% by mass or more, 0.1% by mass or more, 1% by mass or more, or 5% by mass or more with respect to 100% by mass of the total amount of the resin composition. In other words, the content of the additive in the resin composition is preferably 0.01 to 50% by mass.

<Block Copolymer or Hydrogenated Product Thereof>

This section describes the constituent components, usage ratios, properties, and the like of the block copolymers or hydrogenated products thereof that may be used as the thermoplastic resin (A) and to obtain the thermoplastic resin (B).

(Structure of Polymer Block (A-1))

The polymer block (A-1) constituting the block copolymer preferably has a structural unit derived from an aromatic vinyl compound used as a monomer from the viewpoint of mechanical properties such as vibration damping properties and impact resistance.

The polymer block (A-1) preferably contains more than 70 mol % of a structural unit derived from an aromatic vinyl compound (hereinafter sometimes abbreviated as "aromatic vinyl compound unit") in the polymer block (A-1), and from the viewpoint of mechanical properties such as impact resistance, the content is more preferably 80 mol % or more, still more preferably 90 mol % or more, yet still more preferably 95 mol % or more, and particularly preferably substantially 100 mol %. In other words, the content of the structural unit derived from an aromatic vinyl compound in the polymerization block (A-1) is preferably more than 70 mol % and 100 mol % or less.

Examples of the aromatic vinyl compound include styrene, o-methylstyrene, m-methylstyrene, p-methylstyrene, α-methylstyrene, ß-methylstyrene, 2,6-dimethylstyrene, 2,4-dimethylstyrene, α-methyl-o-methylstyrene, α-methyl-m-methylstyrene, α-methyl-p-methylstyrene, ß-methyl-o-methylstyrene, ß-methyl-m-methylstyrene, ß-methyl-p-methylstyrene, 2,4,6-trimethylstyrene, α-methyl-2,6-dimethylstyrene, α-methyl-2,4-dimethylstyrene, ß-methyl-2,6-dimethylstyrene, ß-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, ß-chloro-o-chlorostyrene, ß-chloro-m-chlorostyrene, ß-chloro-p-chlorostyrene, 2,4,6-trichlorostyrene, α-chloro-2,6-dichlorostyrene, α-chloro-2,4-dichlorostyrene, ß-chloro-2,6-dichlorostyrene, ß-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, styrene derivatives substituted with a silyl group, indene, vinylnaphthalene, and N-vinylcarbazole. These aromatic vinyl compounds may be used alone, or two or more kinds thereof may be used in combination. Among these, from the viewpoint of production cost and physical property balance, styrene, α-methylstyrene, p-methylstyrene, and mixtures thereof are preferable, and styrene is more preferable.

The polymer block (A-1) may contain a structural unit derived from an unsaturated monomer other than the aromatic vinyl compound (hereinafter sometimes abbreviated as "other unsaturated monomer unit") as long as the object and effects of the present invention are not impaired. The content of the structural unit in the polymer block (A-1) is preferably 30 mol % or less, more preferably less than 20 mol %, still more preferably less than 15 mol %, yet still more preferably less than 10 mol %, even yet still more preferably less than 5 mol %, and particularly preferably 0 mol %. In other words, the content of the other unsaturated monomer unit in the polymer block (A-1) is preferably 0 to 30 mol %.

Examples of the other unsaturated monomer include at least one selected from the group consisting of butadiene, isoprene, 2,3-dimethylbutadiene, 1,3-pentadiene, 1,3-hexadiene, isobutylene, methyl methacrylate, methyl vinyl ether, ß-pinene, 8,9-p-menthene, dipentene, methylenenorbornene, 2-methylenetetrahydrofuran and the like. In the case where the polymer block (A-1) contains the other unsaturated monomer unit, the bonding form is not particularly limited and may be random or tapered.

The block copolymer have at least one polymer block (A-1). In the case where the block copolymer has two or more polymer blocks (A-1), these polymer blocks (A-1) may be the same or different. In the description herein, the expression "the polymer blocks are different" means that at least one of the monomer units constituting the polymer blocks, the weight average molecular weight, the stereoregularity, and in the case of having a plurality of monomer units, the ratio of each monomer unit and the mode of copolymerization (random, gradient, block) is different.

(Weight Average Molecular Weight of Polymer Block (A-1))

The weight average molecular weight (Mw) of the polymer block (A-1) is not particularly limited, but the weight average molecular weight of at least one polymer block (A-1) among the polymer blocks (A-1) included in the block copolymer is preferably 3,000 to 60,000, and more preferably 4,000 to 50,000. When the block copolymer has at least one polymer block (A-1) having a weight average molecular weight within the above range, the block copolymer contributes to further improvement of vibration damping properties.

Note that the weight average molecular weight is a weight average molecular weight in terms of standard polystyrene obtained by gel permeation chromatography (GPC) measurement.

(Content of Polymer Block (A-1))

The content of the polymer block (A-1) in the block copolymer is preferably 50% by mass or less, more preferably 30% by mass or less, still more preferably 16% by mass or less, and particularly preferably 14% by mass or less. When the content is 50% by mass or less, a block copolymer or a hydrogenated product thereof having appropriate flexibility and excellent vibration damping properties without a decrease in tan δ peak top intensity is obtainable. The lower limit value is preferably 1% by mass or more, more preferably 3% by mass or more, and still more preferably 6% by mass or more. When the content is 1% by mass or more, a block copolymer or a hydrogenated product thereof having mechanical properties such as impact resistance and handling properties such as moldability and coating properties suitable for various applications of the resin composition is obtainable. In other words, the content of the polymerization block (A-1) in the block copolymer is preferably 1 to 50% by mass.

The content of the polymer block (A-1) in the block copolymer is a value obtained by $^1$H-NMR measurement, and more specifically, a value measured according to the method described in Examples.

(Structure of Polymer Block (A-2))

The polymer block (A-2) constituting the block copolymer is a structural unit derived from a conjugated diene compound. The polymer block (A-2) preferably has a structural unit containing at least one alicyclic skeleton (X) represented by the following formula (X) in the main chain (hereinafter, sometimes abbreviated as "alicyclic skeleton-containing unit"). The polymer block (A-2) may also contain a structural unit derived from a conjugated diene compound that does not contain an alicyclic skeleton (X) (hereinafter sometimes abbreviated as "conjugated diene unit").

The total amount of the alicyclic skeleton-containing unit and the conjugated diene unit in the polymer block (A-2) is preferably 50 mol % or more, more preferably 70 mol % or more, still more preferably 90 mol % or more, and particularly preferably substantially 100 mol %, from the viewpoint of developing excellent vibration damping properties. In other words, the total of the alicyclic skeleton-containing unit and the conjugated diene unit in the polymerization block (A-2) is preferably 50 to 100 mol %.

In the case where the block copolymer has two or more polymer blocks (A-2), these polymer blocks (A-2) may be the same or different.

In the formula (X), $R^1$ to $R^3$ each independently represent a hydrogen atom or a hydrocarbon group having 1 to 11 carbon atoms, and a plurality of $R^1$ to $R^3$ may be the same or different. The number of carbon atoms of the hydrocarbon group is preferably 1 to 5, more preferably 1 to 3, and still more preferably 1 (that is, a methyl group). In addition, the hydrocarbon group may be a linear or branched chain, and may be a saturated or unsaturated hydrocarbon group. From the viewpoints of physical properties and formation of the alicyclic skeleton (X), it is particularly preferable that $R^1$ to $R^3$ are each independently a hydrogen atom or a methyl group.

When the block copolymer is hydrogenated, the vinyl group in the formula (X) may be hydrogenated to form a hydrogenated product. Therefore, the meaning of the alicyclic skeleton (X) in the hydrogenated product includes a skeleton in which a vinyl group in the formula (X) is hydrogenated.

The polymer block (A-2) is a structural unit derived from a conjugated diene compound, and the alicyclic skeleton (X) is derived from the conjugated diene compound. The alicyclic skeleton (X) is formed by anionic polymerization of a conjugated diene compound by a method described later, and at least one alicyclic skeleton (X) is included in the main chain of the alicyclic skeleton-containing unit depending on the conjugated diene compound used. Since the alicyclic skeleton (X) is incorporated into the main chain of the structural unit contained in the polymer block (A-2), molecular motion is reduced, so that the glass transition temperature is increased, and the peak top intensity of tan δ at around room temperature is improved, whereby excellent vibration damping properties are developed.

Examples of the conjugated diene compound include butadiene, isoprene, hexadiene, 2,3-dimethyl-1,3-butadiene, 2-phenyl-1,3-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, farnesene, myrcene, and chloroprene. Among them, butadiene, isoprene, or a combination of butadiene and isoprene is preferable.

When butadiene and isoprene are used in combination, the blending ratio [isoprene/butadiene] (mass ratio) thereof is not particularly limited, but is preferably 5/95 to 95/5, more preferably 10/90 to 90/10, still more preferably 40/60 to 70/30, and particularly preferably 45/55 to 65/35. When the mixing ratio [isoprene/butadiene] is shown in molar ratio, it is preferably 5/95 to 95/5, more preferably 10/90 to 90/10, still more preferably 40/60 to 70/30, and particularly preferably 45/55 to 55/45.

As a specific example, the alicyclic skeleton (X) mainly produced when butadiene, isoprene, or a combination of butadiene and isoprene is used as the conjugated diene compound will be described.

When butadiene is used alone as the conjugated diene compound, an alicyclic skeleton (X) having a combination of substituents of the following (i) is produced. That is, in this case, the alicyclic skeleton (X) is only an alicyclic skeleton in which $R^1$ to $R^3$ each are a hydrogen atom at the same time. Therefore, an example of a preferred aspect of the block copolymer or the hydrogenated product thereof includes a block copolymer in which the polymer block (A-2) has a structural unit containing one kind of alicyclic skeleton (X) in which $R^1$ to $R^3$ each are a hydrogen atom at the same time in the main chain.

In addition, when isoprene is used alone as the conjugated diene compound, two kinds of alicyclic skeletons (X) having a combination of substituents selected from the following (v) and (vi) are mainly produced.

In addition, when butadiene and isoprene are used in combination as the conjugated diene compound, six kinds of alicyclic skeletons (X) having a combination of substituents selected from the following (i) to (vi) are mainly produced.

(i): $R^1$=Hydrogen atom, $R^2$=Hydrogen atom, $R^3$=Hydrogen atom (ii): $R^1$=Hydrogen atom, $R^2$=Methyl group, $R^3$=Hydrogen atom (iii): $R^1$=Hydrogen atom, $R^2$=Hydrogen atom, $R^3$=Methyl group (iv): $R^1$=Methyl group, $R^2$=Hydrogen atom, $R^3$=Hydrogen atom (v): $R^1$=Methyl group, $R^2$=Methyl group, $R^3$=Hydrogen atom (vi): $R^1$=Methyl group, $R^2$=Hydrogen atom, $R^3$=Methyl group In the above formula (X), at least one kind of the alicyclic skeleton (X) in the polymer block (A-2) is preferably an alicyclic skeleton (X') in which at least one of $R^1$ to $R^3$ is a hydrocarbon group having 1 to 11 carbon atoms, from the viewpoints of further reducing molecular motion and further improving vibration damping properties by having a substituent which is a hydrocarbon group. Among them, the hydrocarbon group in the alicyclic skeleton (X') is more preferably a methyl group from the viewpoints of efficiently producing an alicyclic skeleton from a conjugated diene compound and balancing mechanical properties such as vibration damping properties and impact resistance.

In particular, it is more preferable to be the alicyclic skeleton that $R^1$ to $R^3$ each independently represent a hydrogen atom or a methyl group, and $R^1$ to $R^3$ each are not a hydrogen atom at the same time. That is, the polymer block (A-2) more preferably has a structural unit containing any one or more kinds of alicyclic skeletons having a combination of substituents selected from (ii) to (vi) in the main chain.

(Vinyl Bond Amount of Polymer Block (A-2))

When the structural unit constituting the polymer block (A-2) is any of an isoprene unit, a butadiene unit, and a unit of a mixture of isoprene and butadiene, as the bonding form of each of isoprene and butadiene other than the bonding form forming the alicyclic skeleton (X), a 1,2-bond and a 1,4-bond can be taken in the case of butadiene, and a 1,2-bond, a 3,4-bond, and a 1,4-bond can be taken in the case of isoprene.

In the block copolymer and the hydrogenated product thereof, the total content of the 3,4-bond unit and the 1,2-bond unit in the polymer block (A-2) (hereinafter may be simply referred to as "vinyl bond amount") is preferably 55 to 95 mol %, more preferably 63 to 95 mol %, and still more preferably 70 to 95 mol %. Within the above range, excellent vibration damping properties are developed.

Here, the vinyl bond amount is a value calculated by $^1$H-NMR measurement according to the method described in Examples.

In the case where the polymer block (A-2) is composed only of butadiene, the "content of the 3,4-bond unit and the 1,2-bond unit" is replaced with the "content of the 1,2-bond unit".

(Alicyclic Skeleton (X) Content of Polymer Block (A-2))

Although the polymer block (A-2) may contain a structural unit containing an alicyclic skeleton (X) in the main chain, it is preferable that the polymer block (A-2) contains an alicyclic skeleton (X) in an amount of 1 mol % or more, more preferably 1.1 mol % or more, still more preferably 1.4 mol % or more, yet still more preferably 1.8 mol % or more, even yet still more preferably 4 mol % or more, even still more preferably 10 mol % or more, and particularly preferably 13 mol % or more, from the viewpoints of developing a more excellent vibration damping effect and easily suppressing a decrease in resin strength even at a high temperature. The upper limit of the content of the alicyclic skeleton (X) in the polymer block (A-2) is not particularly limited as long as the effects of the present invention are not impaired. From the viewpoint of productivity, the upper limit is preferably 40 mol % or less, may be 30 mol % or less, may be 20 mol % or less, and may be 18 mol % or less. In other words, the content of the alicyclic skeleton (X) in the polymer block (A-2) is preferably 1 to 40 mol %.

From the viewpoint of further improving vibration damping properties, it is more preferable that the polymer block (A-2) contains the alicyclic skeleton (X') in an amount of 1 mol % or more, still more preferably 1.3 mol % or more, and yet still more preferably 1.6 mol % or more. The upper limit value of the content of the alicyclic skeleton (X') is the same as the upper limit value of the content of the alicyclic skeleton (X). In other words, the content of the alicyclic skeleton (X') in the polymerization block (A-2) is preferably 1 to 40 mol %.

More specifically, when isoprene is used, when butadiene is used, or when butadiene and isoprene are used in combination as the conjugated diene compound, the alicyclic skeleton content in each case is as follows.

When isoprene is used as the conjugated diene compound, one or more alicyclic skeletons (X') having a combination of the substituents of the above (v) and (vi) may be present in the polymer block (A-2). The total content of them is preferably 1 mol % or more from the viewpoint of facilitating the development of a more excellent vibration damping effect, more preferably 1.5 mol % or more, and still more preferably 2 mol % or more from the viewpoint of obtaining an excellent vibration damping effect over a wide temperature range, yet still more preferably 3 mol % or more, and particularly preferably 4 mol % or more. When isoprene is used, the upper limit value of the total content is the same as the upper limit value of the content of the alicyclic skeleton (X). In other words, when isoprene is used, the content of the alicyclic skeleton (X') having a combination of the substituents of the above (v) and (vi) in the polymer block (A-2) is preferably 1 to 40 mol %.

When butadiene is used as the conjugated diene compound, which may provide an alicyclic skeleton (X) in the polymer block (A-2), the content thereof is preferably 5 mol % or more from the viewpoint of facilitating the development of a more excellent vibration damping effect, and more preferably 10 mol % or more, still more preferably 15 mol % or more, yet still more preferably 20 mol % or more, even yet still more preferably 25 mol % or more, and particularly preferably 30 mol % or more. When butadiene is used, the upper limit value of the content is the same as the upper limit value of the content of the alicyclic skeleton (X). In other words, when butadiene is used, the content of the alicyclic skeleton (X) in the polymerization block (A-2) is preferably 5 to 40 mol %.

When butadiene and isoprene are used in combination as the conjugated diene compound, which may provide one or more alicyclic skeletons (X') having a combination of the substituents of the above (ii), (v) and (vi) in the polymer block (A-2), the total content thereof is preferably 1 mol % or more from the viewpoint of facilitating the development of a more excellent vibration damping effect, and more preferably 2 mol % or more, still more preferably 5 mol % or more, yet still more preferably 8 mol % or more, and even yet still more preferably 13 mol % or more. When butadiene and isoprene are used in combination, the upper limit value of the total content is the same as the upper limit value of the content of the alicyclic skeleton (X). In other words, when butadiene and isoprene are used in combination, the total content of the alicyclic skeleton (X') having a combination of the substituents of the above (ii), (v), and (vi) in the polymer block (A-2) is preferably 1 to 40 mol %.

Further, when butadiene and isoprene are used in combination as the conjugated diene compound, one or more alicyclic skeletons (X) having a combination of the substituents of the above (i) to (vi) may be present in the polymer block (A-2). The total content of them is preferably 1 mol % or more from the viewpoint of facilitating the development of a more excellent vibration damping effect, and more preferably 5 mol % or more. When butadiene and isoprene are used in combination, the upper limit value of the total content is the same as the upper limit value of the content of the alicyclic skeleton (X). In other words, when butadiene and isoprene are used in combination, the total content of the alicyclic skeleton (X) having a combination of the substituents of (i) to (vi) in the polymer block (A-2) is preferably 1 to 40 mol %.

Note that the content of the alicyclic skeleton (X) (including (X')) contained in the block copolymer or the hydrogenated product thereof is a value obtained from an integral value derived from the alicyclic skeleton (X) in the polymer block (A-2) by $^{13}$C-NMR measurement of the block copolymer, and more specifically, a value measured according to the method described in Examples.

In addition, in the block copolymer or the hydrogenated product thereof, when the hydrogenation rate of the polymer block (A-2) is 0 mol % or more and less than 50 mol %, the content molar ratio of the vinyl group bonded to the alicyclic skeleton (X) and the vinyl group bonded to the main chain can be specified.

For example, in the alicyclic skeleton (X') having a combination of the substituents of the above (ii), (v), and (vi), the chemical shift in $^{13}$C-NMR of the vinyl group-terminated carbon atom bonded to the alicyclic skeleton (X') ((a) in the following chemical formula) appears in the vicinity of 107 to 110 ppm, and the chemical shift in $^{13}$C-NMR of the vinyl group-terminated carbon atom bonded to the main chain ((b) in the following chemical formula) appears in the vicinity of 110 to 116 ppm. When the hydrogenation rate is 0 to 40 mol %, the peak area ratio measured by $^{13}$C-NMR [chemical shift value 107 to 110 ppm peak area]/[chemical shift value 110 to 116 ppm peak area] is usually in the range of 0.01 to 3.00. From the viewpoint of developing more excellent vibration damping properties, the peak area ratio is preferably 0.01 to 1.50, more preferably 0.01 to 1.00, still more preferably 0.01 to 0.50, and yet still more preferably 0.01 to 0.20.

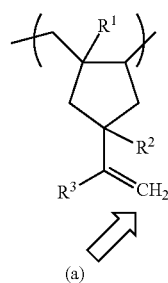

(a)

1,2-bond of butadiene

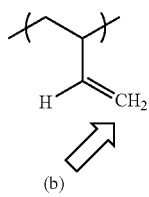
(b)

3,4-bond of isoprene

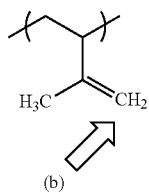
(b)

1,2-bond of isoprene

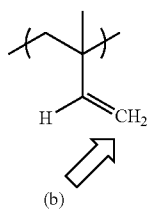
(b)

Regarding the hydrogenated product, a peak derived from a carbon atom on the alicyclic skeleton (X) is hardly observed in the $^{13}$C-NMR measurement, but a peak derived from a carbon atom on the alicyclic skeleton (X) in which the substituent $R^3$ is a hydrocarbon group having 1 to 11 carbon atoms and is bonded to a vinyl group-derived branched alkyl group having the $R^3$ can be observed.

Thus, when the hydrogenation rate of the polymer block (A-2) is 50 to 99 mol % with respect to the hydrogenated product, the content molar ratio of the carbon atoms on the alicyclic skeleton (X) bonded to the vinyl group-derived branched alkyl group having the $R^3$ to the carbon atoms on the main chain bonded to the vinyl group-derived branched alkyl group can be specified.

For example, in the alicyclic skeleton (X) having a combination of the substituents of the above (iii) and (vi), the chemical shift in $^{13}$C-NMR of the carbon atom on the alicyclic skeleton (X) bonded to an isoprene group ((c) in the following chemical formula) appears in the vicinity of 50.0 to 52.0 ppm, and the chemical shift in $^{13}$C-NMR of the carbon atom on a main chain bonded to an isoprene group ((d) in the following chemical formula) appears in the vicinity of 43.0 to 45.0 ppm. When the hydrogenation rate is 40 to 99 mol %, the peak area ratio measured by $^{13}$C-NMR [chemical shift value 50.0 to 52.0 ppm peak area]/[chemical shift value 43.0 to 45.0 ppm peak area] is usually in the range of 0.01 to 3.00. From the viewpoint of developing more excellent vibration damping properties, the peak area ratio is preferably in the range of 0.01 to 1.50, more preferably in the range of 0.01 to 1.00, still more preferably in the range of 0.01 to 0.50, and yet still more preferably in the range of 0.01 to 0.25.

More specifically, the peak area ratio can be measured according to the method described in Examples.

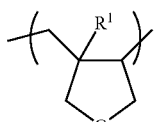
(c)

3,4-bond of isoprene

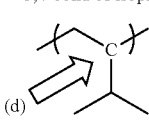
(d)

(Weight Average Molecular Weight of Polymer Block (A-2))

The total weight average molecular weight of the polymer block (A-2) included in the block copolymer is preferably 15,000 to 800,000, more preferably 50,000 to 700,000, still more preferably 70,000 to 600,000, particularly preferably 90,000 to 500,000, and most preferably 130,000 to 450,000 in a state before hydrogenation from the viewpoint of vibration damping properties and the like.

(Other Structural Unit in Polymer Block (A-2))

The polymer block (A-2) may contain a structural unit derived from a polymerizable monomer other than the conjugated diene compound as long as the object and effects of the present invention are not impaired. In this case, in the polymer block (A-2), the content of the structural unit derived from a polymerizable monomer other than the conjugated diene compound is preferably less than 50 mol %, more preferably less than 30 mol %, still more preferably less than 20 mol %, yet still more preferably less than 10 mol %, and particularly preferably 0 mol %. In other words, in the polymer block (A-2), the content of the structural unit derived from a polymerizable monomer other than the conjugated diene compound is preferably 0 mol % or more and less than 50 mol %.

Preferred examples of the other polymerizable monomer include aromatic vinyl compounds such as styrene, α-methylstyrene, o-methylstyrene, m-methylstyrene, p-methylstyrene, p-t-butylstyrene, 2,4-dimethylstyrene, N-vinylcarbazole, vinylnaphthalene, and vinylanthracene; and at least one compound selected from the group consisting of methyl methacrylate, methyl vinyl ether, ß-pinene, 8,9-p-menthene, dipentene, methylenenorbornene, 2-methylenetetrahydrofuran, 1,3-cyclopentadiene, 1,3-cyclohexadiene, 1,3-cycloheptadiene, and 1,3-cyclooctadiene.

The block copolymer may have at least one polymer block (A-2) described above. In the case where the block copolymer has two or more polymer blocks (A-2), these polymer blocks (A-2) may be the same or different.

(Bonding Form of Polymer Block (A-1) and Polymer Block (A-2))

The bonding form of the block copolymer is not limited as long as the polymer block (A-1) and the polymer block (A-2) are bonded to each other, and may be any of a linear bonding form, a branched bonding form, a radial bonding form, and a bonding form in which two or more of these are combined. Among these, the bonding form between the polymer block (A-1) and the polymer block (A-2) is preferably linear, and examples thereof include a diblock copolymer represented by A-B, a triblock copolymer represented by A-B-A or B-A-B, a tetrablock copolymer represented by A-B-A-B, a pentablock copolymer represented by A-B-A-B-A or B-A-B-A-B, and a (A-B)nZ type copolymer (where Z represents a coupling agent residue and n represents an integer of 3 or more) when the polymer block (A-1) is represented by A and the polymer block (A-2) is represented by B. Among them, a linear triblock copolymer or a diblock copolymer is preferable, and an A-B-A type triblock copolymer is preferably used from the viewpoints of flexibility, ease of production, and the like.

Specific examples of the A-B-A type triblock copolymer include a styrene-hydrogenated butadiene/isoprene-styrene copolymer. That is, at least a styrene-hydrogenated butadiene/isoprene-styrene copolymer is preferably contained as the block copolymer.

Here, in the description herein, when polymer blocks of the same type are linearly bonded via a bifunctional coupling agent or the like, the entire bonded polymer blocks are treated as one polymer block. Accordingly, including the above-described examples, a polymer block that should be originally strictly denoted by Y—Z—Y (Z represents a coupling residue) is represented as Y as a whole unless it is necessary to distinguish it from a single polymer block Y. In the description herein, since a polymer block of this type containing a coupling agent residue is treated as described above, for example, a block copolymer containing a coupling agent residue that should be originally strictly denoted by A-B—Z—B-A (Z represents a coupling agent residue) is represented by A-B-A and is treated as an example of a triblock copolymer.

(Content of Polymer Blocks (A-1) and (A-2))

The block copolymer may contain a polymer block composed of monomers other than the polymer blocks (A-1) and (A-2) as long as the objects and effects of the present invention are not impaired, but the total content of the polymer blocks (A-1) and (A-2) is preferably 90% by mass or more, more preferably 95% by mass or more, and particularly preferably substantially 100% by mass. When the content is 90% by mass or more, the resin composition becomes easily to exhibit more excellent vibration damping properties. In other words, the total content of the polymer block (A-1) and the polymer block (A-2) in the block copolymer is preferably 90 to 100% by mass.

(Polymer Block (B-1))

The structural unit constituting the polymer block (B-1), the content ratio of the structural unit, the type of the compound from which the above structural unit is derived, the weight average molecular weight of the polymer block (B-1), the vinyl bond amount of the polymer block (B-1), and the content of the polymer block (B-1) in the block copolymer are the same as those of the polymer block (A-1) described above. However, when the thermoplastic resin (A) and the thermoplastic resin (B) are different from each other by making the polymer block (A-1) and the polymer block (B-1) different from each other, at least one of the above-mentioned elements of the polymer block (B-1) is made different from the polymer block (A-1).

(Polymer Block (B-2))

The structural unit constituting the polymer block (B-2), the content ratio of the structural unit, the type of the compound from which the above structural unit is derived, the weight average molecular weight of the polymer block (B-2), the vinyl bond amount of the polymer block (B-2), the alicyclic skeleton (X) content of the polymer block (B-2), and the content of the polymer block (B-2) in the block copolymer are the same as those of the polymer block (A-2) described above. However, when the thermoplastic resin (A) and the thermoplastic resin (B) are different from each other by making the polymer block (A-2) and the polymer block (B-2) different from each other, at least one of the above-mentioned elements of the polymer block (B-2) is made different from the polymer block (A-2).

(Bonding Form of Polymer Block (B-1) and Polymer Block (B-2))

The bonding form of the polymer blocks (B-1) and (B-2) in the block copolymer is the same as the bonding form of the polymer blocks (A-1) and (A-2) described above. However, when the bonding form of the polymer blocks (B-1) and (B-2) is made different from the bonding form of the polymer blocks (A-1) and (A-2) to make the thermoplastic resin (A) and the thermoplastic resin (B) different from each other, they are different from each other.

(Content of Polymer Blocks (B-1) and (B-2))

The contents of the polymer blocks (B-1) and (B-2) in the block copolymer are the same as the contents of the polymer blocks (A-1) and (A-2) described above. However, when the contents of the polymer blocks (B-1) and (B-2) are made different from the contents of the polymer blocks (A-1) and (A-2) to make the thermoplastic resin (A) and the thermoplastic resin (B) different from each other, they are different from each other.

(Weight Average Molecular Weight of Block Copolymer or Hydrogenated Product Thereof)

The weight average molecular weight (Mw) of the block copolymer and the hydrogenated product thereof determined by gel permeation chromatography in terms of standard polystyrene is preferably 15,000 to 800,000, more preferably 50,000 to 700,000, still more preferably 60,000 to 600,000, yet still more preferably 70,000 to 600,000, particularly preferably 90,000 to 500,000, and most preferably 130,000 to 450,000. When the weight average molecular weight of the block copolymer and the hydrogenated product thereof is 15,000 or more, the heat resistance is increased, and when the weight average molecular weight is 800,000 or less, the handleability of the resin composition is improved.

(Peak Top Temperature and Intensity of Tan δ of Block Copolymer or Hydrogenated Product Thereof)

Tan δ (loss tangent) of a block copolymer or a hydrogenated product thereof is a ratio of (loss modulus)/(storage modulus) at a frequency of 1 Hz in dynamic viscoelasticity measurement, and the peak top temperature and intensity of tan δ greatly contribute to vibration damping properties and other physical properties. Here, the peak top intensity of tan δ refers to a value of tan when the peak of tan δ becomes maximum. Further, the peak top temperature of tan δ is a temperature at which the peak of tan δ becomes maximum.

(Tan δ Intensity of Block Copolymer or Hydrogenated Product Thereof)

In the description herein, the peak top temperature and intensity of tan of a block copolymer or a hydrogenated product thereof are measured by pressing the block copolymer or the hydrogenated product thereof at a temperature of 230° C. and a pressure of 10 MPa for 3 minutes to prepare a single-layer sheet having a thickness of 1.0 mm, cutting the single-layer sheet into a disk shape, and measuring the disk-shaped sheet as a test piece. The measurement conditions are, in accordance with JIS K 7244-10 (2005), a strain amount of 0.1%, a frequency of 1 Hz, a measurement temperature of −70° C. to +100° C., and a heating rate of 3° C./min.

The peak top temperature and the tan δ intensity of the block copolymer or the hydrogenated product thereof are more specifically values measured according to the methods described in Examples.

The peak top intensity of tan δ of the block copolymer or the hydrogenated product thereof may be 1.0 or more by the above-described measurement, and the peak top intensity of tan δ of a higher one may be 1.5 or more, and even 1.9 or more. The higher the peak top intensity of tan δ, the better the physical properties such as vibration damping properties at that temperature. When the peak top intensity is 1.0 or more, vibration damping properties sufficient in an actual use environment are obtainable.

The peak top temperature of tan δ of the block copolymer or the hydrogenated product thereof is preferably −50° C. or higher, more preferably −40° C. or higher, still more preferably −30° C. or higher, yet still more preferably −25° C. or higher, and may be 0° C. or higher. The upper limit of the peak top temperature of tan δ may be within a range that does not impair the effects of the present invention, and may be +50° C. or lower, +40° C. or lower, or +35° C. or lower. The range of the peak top temperature of tan δ is, for example, preferably −50 to +50° C., more preferably −40 to +40° C., still more preferably −30 to +30° C., and yet still more preferably −25 to +25° C. When the peak top temperature of tan δ is −50° C. or higher or +50° C. or lower, vibration damping properties sufficient in an actual use environment are obtainable.

[Production Method]

<Method for Producing Block Copolymer>

As a method for producing a block copolymer, for example, a block copolymer can be obtained by polymerizing one or more conjugated diene compounds as monomers by an anionic polymerization method to form a first polymer block, then adding a monomer of a second polymer block, and if necessary, sequentially adding a monomer of the second polymer block and a conjugated diene compound. When the thermoplastic resin (A) containing the structure of the alicyclic skeleton (X) is produced, for example, a block copolymer can be obtained by polymerizing one or more conjugated diene compounds as monomers by an anionic polymerization method to form a polymer block (A-2) having a structural unit containing the alicyclic skeleton (X) in the main chain, adding the monomer of the polymer block (A-1), and if necessary, sequentially adding the monomer of the polymer block (A-1) and the conjugated diene compound.

As a method for producing an alicyclic skeleton by the anionic polymerization method, a known technique is available (for example, see U.S. Pat. No. 3,966,691). The alicyclic skeleton is formed at the end of the polymer by depletion of the monomer, and the polymerization can be started again from the alicyclic skeleton by sequential addition of further monomers. Therefore, the presence or absence of the formation of the alicyclic skeleton and the content thereof can be adjusted by the sequential addition time of the monomer, the polymerization temperature, the type and addition amount of the catalyst, the combination of the monomer and the catalyst, or the like. In the anionic polymerization method, an anionic polymerization initiator, a solvent and, if necessary, a Lewis base can be used.

Examples of an organolithium compound which can be used as a polymerization initiator for anionic polymerization in the above-mentioned method include methyllithium, ethyllithium, n-butyllithium, sec-butyllithium, tert-butyllithium, and pentyllithium. Further, examples of a dilithium compound that can be used as the polymerization initiator include naphthalenedilithium and dilithiohexylbenzene.

Examples of the coupling agent include dichloromethane, dibromomethane, dichloroethane, dibromoethane, dibromobenzene, and phenyl benzoate.

The amounts of the polymerization initiator and the coupling agent to be used are appropriately determined depending on the desired weight average molecular weight of the block copolymer and the hydrogenated product thereof. In general, the initiator such as an alkyllithium compound or a dilithium compound is preferably used in an amount of 0.01 to 0.2 parts by mass per 100 parts by mass of the total of monomers such as the monomer of the polymer block (A) used for polymerization and the conjugated diene compound. When a coupling agent is used, it is preferably used in an amount of 0.001 to 0.8 parts by mass per 100 parts by mass of the total of the monomers.

The solvent is not particularly limited as long as it does not adversely affect the anionic polymerization reaction, and examples thereof include aliphatic hydrocarbons such as cyclohexane, methylcyclohexane, n-hexane, and n-pentane; and aromatic hydrocarbons such as benzene, toluene, and xylene. The polymerization reaction is usually carried out at a temperature of 0 to 100° C., preferably 10 to 70° C. for 0.5 to 50 hours, preferably 1 to 30 hours.

In addition, by a method of adding a Lewis base as a co-catalyst at the time of polymerization of the conjugated diene compound, it is possible to increase the content of the 3,4-bond and the 1,2-bond and the content of the alicyclic skeleton (X) in the polymer block (A-2).

Examples of Lewis bases which can be used include ethers such as dimethyl ether, diethyl ether, tetrahydrofuran, and 2,2-di(2-tetrahydrofuryl) propane (DTHFP); glycol ethers such as ethylene glycol dimethyl ether, diethylene glycol dimethyl ether, triethylene glycol dimethyl ether, and tetraethylene glycol dimethyl ether; amines such as triethylamine, N,N,N',N'-tetramethylenediamine, N,N,N',N'-tetramethylethylenediamine (TMEDA), and N-methylmorpholine; and metal salts such as sodium or potassium salts of aliphatic alcohols such as sodium t-butylate, sodium t-amylate or sodium isopentylate or sodium or potassium salts of alicyclic alcohols such as dialkylsodium cyclohexanolate, for example sodium mentholate. These Lewis bases may be used alone or in combination of two or more.

When the polymer block (A-2) or the polymer block (B-2) particularly contains a structural unit derived from isoprene and/or butadiene, the amount of the Lewis base to be added is determined depending on the degree of control of the vinyl bond amount of isoprene units and/or butadiene units constituting the polymer block (A-2) or the polymer block (B-2) and depending on the degree of control of the content of the alicyclic skeleton (X). Therefore, the amount of the Lewis base to be added is not limited in a strict sense, but is preferably in the range of usually 0.1 to 1,000 mol, and preferably 1 to 100 mol per gram atom of lithium contained in an alkyllithium compound or a dilithium compound used as a polymerization initiator.

The average feed rate of the conjugated diene compound (hereinafter may be referred to as "average diene feed rate") is, for example, preferably 150 kg/h or less, more preferably 110 kg/h or less, and still more preferably 55 kg/h or less, and may be 45 kg/h or less, 30 kg/h or less, or 22 kg/h or less per 1 mol of the active terminal, from the viewpoint of increasing the content of the alicyclic skeleton (X). From the viewpoint of enhancing productivity, the lower limit value is preferably 1 kg/h or more, more preferably 3 kg/h or more, and still more preferably 5 kg/h or more, and may be 7 kg/h or more, may be 10 kg/h or more, or may be 15 kg/h or more per 1 mol of the active terminal. In other words, the average diene feed rate is preferably 1 to 150 kg/h per 1 mol of the active terminal.

After the polymerization is carried out by the above-described method, an active hydrogen compound such as an alcohol, a carboxylic acid or water is added to terminate the polymerization reaction, whereby a block copolymer can be obtained.

<Method for Producing Hydrogenated Product>

When the block copolymer obtained by the above-described production method is used as a hydrogenated product, a hydrogenation reaction is performed in an inert organic solvent in the presence of a hydrogenation catalyst. By the hydrogenation reaction, the carbon-carbon double bond derived from the conjugated diene compound in the polymer block (A-2) or the polymer block (B-2) in the block copolymer is hydrogenated, and thus a hydrogenated product of the block copolymer can be obtained.

The hydrogenation reaction may be carried out at a hydrogen pressure of about 0.1 to 20 MPa, preferably 0.5 to 15 MPa, more preferably 0.5 to 5 MPa, a reaction temperature of about 20 to 250° C., preferably 50 to 180° C., more preferably 70 to 180° C., and a reaction time of about 0.1 to 100 hours, preferably 1 to 50 hours.

Examples of the hydrogenation catalyst include Raney nickel; heterogeneous catalysts in which a metal such as Pt, Pd, Ru, Rh, or Ni is supported on a carrier such as carbon, alumina, or diatomaceous earth; Ziegler catalysts composed of a combination of a transition metal compound and an alkylaluminum compound or an alkyllithium compound; and metallocene catalysts.

The hydrogenated product thus formed can be obtained by pouring a polymerization reaction solution into methanol or the like to precipitate it, followed by heating or drying under reduced pressure, or by pouring the polymerization reaction solution into hot water together with steam to perform so-called steam stripping for removing the solvent by azeotropic distillation, followed by heating or drying under reduced pressure.

Whether to use the block copolymer or the hydrogenated product can be determined depending on the performance desired in various applications of the resin composition. Similarly, the hydrogenation rate of the carbon-carbon double bond in the polymer block (A-2) or the polymer block (B-2) when used as the hydrogenated product can be determined depending on the performance desired in various applications of the resin composition.

For example, as the hydrogenation rate of the hydrogenated product is higher, the heat resistance and the weather resistance of the hydrogenated product can be improved.

Therefore, it may be a block copolymer or a hydrogenated product thereof in which the hydrogenation rate of the polymer block (A-2) or the polymer block (B-2) is 0 mol % or more (that is, including the case of unhydrogenation) and less than 50 mol %, or may be a hydrogenated product thereof in which the hydrogenation rate of the polymer block (A-2) or the polymer block (B-2) is 50 to 99 mol %.

The hydrogenation rate is a value obtained by $^1$H-NMR measurement of the content of carbon-carbon double bonds in the structural unit derived from the conjugated diene compound and the alicyclic skeleton (X) in the polymer block (A-2) or the polymer block (B-2) after hydrogenation, and more specifically, a value measured according to the method described in Examples.

<Method for Producing Modified Product>

The modified product used as the thermoplastic resin (B) can be produced by introducing the above-mentioned reactive functional group into the block copolymer, a hydrogenated product of the block copolymer, or an olefin-based resin. When a modified product of the hydrogenated product of the block copolymer is obtained, it can be produced by introducing the reactive functional group before or after hydrogenation. However, in the case of modification by a radical reaction, from the viewpoint of reaction control, it is preferable to produce the modified product by hydrogenating the block copolymer to form a hydrogenated block copolymer, and then introducing a specific functional group into the hydrogenated block copolymer.

The reaction for modifying a compound such as a hydrogenated block copolymer (hereinafter may be referred to as "modification reaction") can be carried out by a known method.

The modification reaction can be carried out, for example, by dissolving a hydrogenated block copolymer or the like to be modified in an organic solvent, adding thereto various modifiers capable of adding the functional group described above, and reacting the mixture at about 50 to 300° C. for about 0.5 to 10 hours.

The modification reaction can also be carried out, for example, by making a hydrogenated block copolymer or the like to be modified in a molten state using an extruder or the like without using a solvent and adding various modifiers. In this case, the temperature of the modification reaction is usually from the melting point of the compound to be modified to 400° C. or lower, preferably from 90 to 350° C., more preferably from 100 to 300° C., and the reaction time is usually about 0.5 to 10 minutes.

In addition, it is preferable to add a radical initiator when the modification reaction is carried out in a molten state, and an aging inhibitor may be added from the viewpoint of suppressing a side reaction.

In the case of producing the modified product of the hydrogenated block copolymer, the modification reaction is preferably carried out by the latter method of modifying the block copolymer in a molten state from the viewpoints of improving workability, vibration damping properties, and thermal stability.

That is, a preferred aspect of the method for producing a modified hydrogenated product further includes a step of hydrogenating the block copolymer to obtain a hydrogenated block copolymer, and then introducing one or two or more functional groups selected from an alkoxysilyl group, a carboxy group, an amino group, a hydroxy group, an epoxy group, a group derived from an acid anhydride, an ester group, and an oxazoline group into the hydrogenated block copolymer in a molten state using a radical initiator.

Examples of the modifiers capable of adding the functional group described above include dim ethyldiethoxysilane, tetramethoxysilane, tetraethoxysilane, 3-aminopropyltriethoxysilane, vinyltrimethoxysilane, vinyltriethoxysilane, hydroxymethyltriethoxysilane, vinylbenzyldiethylamine, vinylbenzyldimethylamine, 1-glycidyl-4-(2-pyridyl)piperazine, 1-glycidyl-4-phenylpiperazine, 1-glycidyl-4-methylpiperazine, 1-glycidyl-4-methylhomopiperazine, 1-glycidylhexamethyleneimine, and tetraglycidyl-1,3-bisaminomethylcyclohexane. In addition, unsaturated carboxylic acid anhydrides such as maleic anhydride, citraconic anhydride, 2,3-dimethylmaleic anhydride, and itaconic anhydride can also be used as the modifier. Further, the modifiers capable of adding the functional group described above may be employed from modifiers described in JP 2011-132298 A. These modifiers may be used alone or in combination of two or more.

The addition amount of the modifier may be appropriately determined so as to achieve a desired content of the functional group. The amount of the modifier is usually about 0.01 to 10 parts by mass, preferably 0.01 to 5 parts by mass, more preferably 0.01 to 3 parts by mass, and still more preferably 0.05 to 2 parts by mass with respect to 100 parts by mass of the compound to be modified.

As the radical initiator, organic peroxides or organic peresters such as dialkyl peroxides, diacyl peroxides, peroxyesters, peroxyketals, dialkyl peroxides, and hydroperoxides can be used, and azo compounds such as azobisisobutyronitrile and dimethylazoisobutyrate can also be used. Among the above radical initiators, organic peroxides are preferred, and dialkyl peroxides are more preferred.

The addition amount of the radical initiator in the case of producing the modified hydrogenated product may be appropriately determined depending on the combination of the hydrogenated block copolymer and the modifier, and the amount of the radical initiator is usually about 0.01 to 10 parts by mass, preferably 0.01 to 5 parts by mass, more preferably 0.01 to 3 parts by mass, and still more preferably 0.05 to 2 parts by mass with respect to 100 parts by mass of the hydrogenated block copolymer.

In addition, the thermoplastic resin (B) may be produced by copolymerizing a monomer having a reactive functional group (for example, one or two or more functional groups selected from an alkoxysilyl group, a carboxy group, an amino group, a hydroxy group, an epoxy group, a group derived from an acid anhydride, an ester group, a mercapto group, and an oxazoline group) and a monomer not having the above reactive functional group at the time of polymerization. Examples of the monomer having a reactive functional group include maleic anhydride, glycidyl methacrylate, and 2-isopropenyl-2-oxazoline.

<Method for Producing Resin Composition>

The resin composition can be produced, for example, by preparing a mixture of the thermoplastic resin (A) and the thermoplastic resin (B) in a molten state, and mixing the mixture with the polar resin (C). Melt-kneading of the thermoplastic resin (A), the thermoplastic resin (B) having a reactive functional group, and the polar resin (C) enables the core-shell structure easily to be formed.

The procedure for preparing the mixture is not particularly limited, and the mixture can be prepared using, for example, a kneading apparatus. As the kneading apparatus, a method generally used in this field can be employed. Each component may be mixed using a mixer such as a Henschel mixer, a V blender, a ribbon blender, a tumbler blender, or a conical blender, or may be mixed and then kneaded using a single-screw or twin-screw extruder, a kneader, or the like. The temperature during melt-kneading can be appropriately set, but is usually 150 to 300° C., and preferably 160 to 250° C.

One aspect of a method for producing a resin composition includes a step of adding a radical initiator in a molten state to a mixture of the thermoplastic resin (A) and a precursor (B0) of the thermoplastic resin (B) satisfying the following conditions (4) and (5), introducing a reactive functional group into the precursor (B0), thereby obtaining the thermoplastic resin (A) and the thermoplastic resin (B) having the reactive functional group:
  (4) the thermoplastic resin (A) is a block copolymer having a block (A-1) containing more than 70 mol % of an aromatic vinyl monomer unit and a block (A-2) containing 30 mol % or more of a conjugated diene monomer, or a hydrogenated product thereof, and has a glass transition temperature in the range of −30 to +50° C.;
  (5) the precursor (B0) of the thermoplastic resin (B) has a glass transition temperature in the range of −100 to −31° C.

In advance, a radical initiator is added in a molten state to a mixture of the thermoplastic resin (A) and the precursor (B0) of the thermoplastic resin (B) to introduce a reactive functional group into the precursor (B0) to obtain the thermoplastic resin (A) and the thermoplastic resin (B) having the reactive functional group.

In this way, the step of preparing the thermoplastic resin (B) into which the reactive functional group has been introduced in advance can be omitted, the reactive functional group can be introduced into the precursor (B0), and at the same time, a kneaded product of the thermoplastic resin (A) and the thermoplastic resin (B) can be obtained, whereby the production process becomes simplified.

In addition, by using the thermoplastic resin (A) having a glass transition temperature within the above-described numerical range, introduction of a reactive functional group into the thermoplastic resin (B) is promoted, and it is possible to introduce more reactive functional groups into the thermoplastic resin (B).

In one aspect of the method for producing the resin composition of the present invention, the thermoplastic resin (A) is a hydrogenated product of a block copolymer having block (A-1) and block (A-2), and the hydrogenation rate of the hydrogenated product is 50 to 99 mol %.

In one aspect of the method for producing the resin composition of the present invention, the thermoplastic resin (A) has a structure of an alicyclic skeleton represented by the above formula (X) or a hydrogenated product thereof.

In one aspect of the method for producing the resin composition of the present invention, the reactive functional group of the thermoplastic resin (B) is one or two or more functional groups selected from the group consisting of an alkoxysilyl group, an epoxy group, and a group derived from an acid anhydride.

The obtained resin composition may be formed into an appropriate form according to the application, use mode, or the like, and may be formed into, for example, a granular form, a flake form, or a pellet form.

<Method for Producing Resin Modifier>

The above-mentioned method for producing a resin composition, which includes adding a radical initiator in a molten state to a mixture of the thermoplastic resin (A) and the precursor (B0) of the thermoplastic resin (B) satisfying the above-described conditions (4) and (5) to introduce a reactive functional group into the precursor (B0) to obtain the thermoplastic resin (A) and the thermoplastic resin (B) having the reactive functional group, can be said to be a method for producing a resin modifier containing the thermoplastic resin (A) and the resin composition (B). Due to the resin modifier, the polar resin (C) becomes excellent in processability, moldability, mechanical properties, and the like.

[Characteristics of Resin Composition]

<Volume Average Dispersion Diameter>

In the molded article of the resin composition of the present embodiment, the core-shell structure may have a volume average dispersion diameter of 0.01 to 10 μm, or 0.03 to 8 μm, or even 0.05 to 6 μm. When the volume average dispersion diameter of the core-shell structure is within the above numerical range, the dispersibility of the core-shell structure in the polar resin (C) becomes improved, and the mechanical strength of the resin composition becomes improved.

The volume average dispersion diameter of the core-shell structure can be measured by freeze-breaking a test piece using liquid nitrogen, etching the cross-section, then observing a sample on which platinum or the like is vapor-deposited with an SEM, and calculating the average value of the diameters of 50 vacant holes formed by etching in the obtained image as the average dispersion diameter. Specifically, it is a value measured by the procedure described in Examples.

<IZOD Impact Strength>

The resin composition of the present embodiment has good impact resistance. For example, the IZOD impact strength can be 5 [J/m] or more, or 10 [J/m] or more, or even 15 [J/m] or more.

The IZOD impact strength is measured in accordance with JIS K 7110 by an impact strength measuring instrument after storing the prepared test piece at 23° C. for at least 16 hours.

<Loss Factor>

The resin composition of the present embodiment exhibits good vibration damping properties in a wide temperature range.

The good vibration damping properties in a wide temperature range developed by the resin composition of the present embodiment are achieved by suitably controlling the selection and the content ratio of monomers used in the block copolymers, the hydrogenated products of the block copolymers, and the modified products thereof (modified block copolymers and modified hydrogenated products) described above; the balance between the vinyl bond amount and the hydrogenation rate; the production methods of the block copolymers, the hydrogenated products of the block copolymers, and the modified products thereof, and the other components of the block copolymers, the hydrogenated products of the block copolymers, and the modified products thereof, or by the combination of the block copolymer, the hydrogenated product of the block copolymer, and the modified product thereof used in the resin composition, and the resin, and the content ratio thereof, and the like.

For example, a damping test by a central exciting method in accordance with JIS K 7391 (2008) is performed on a test piece molded into a length of 200 mm, a width of 10 mm, and a thickness of 2 mm using the resin composition of the present embodiment, and the loss factor is measured, whereby the vibration damping properties can be evaluated as follows.

The loss factor at a frequency of 300 Hz and a temperature of 0° C. is preferably 0.008 or more. Further, the loss factor may be 0.020 or more, or 0.030 or more.

The loss factor at a frequency of 300 Hz and a temperature of 10° C. is preferably 0.008 or more. Further, the loss factor may be 0.020 or more, or 0.030 or more.

The loss factor at a frequency of 300 Hz and a temperature of 20° C. is preferably 0.008 or more. Further, the loss factor may be 0.020 or more, or 0.030 or more.

The loss factor at a frequency of 300 Hz and a temperature of 30° C. is preferably 0.008 or more. Further, the loss factor may be 0.020 or more, or 0.030 or more.

The loss factor at a frequency of 300 Hz and a temperature of 40° C. is preferably 0.008 or more. Further, the loss factor may be 0.020 or more, or 0.030 or more.

The loss factor at a frequency of 300 Hz and a temperature of 60° C. is preferably 0.008 or more. Further, the loss factor may be 0.020 or more, or 0.030 or more.

The loss factor at a frequency of 300 Hz and a temperature of 80° C. is preferably 0.008 or more. Further, the loss factor may be 0.020 or more, or 0.030 or more.

The loss factor at a frequency of 300 Hz and a temperature of 100° C. is preferably 0.008 or more. Further, the loss factor may be 0.020 or more, or 0.030 or more.

Applications

The resin composition described above may be used for various applications.

The resin composition of the present embodiment has excellent vibration damping properties, and may be used in various applications. Therefore, the present invention also provides a vibration damping material, a film or a sheet, an adhesive, a pressure-sensitive adhesive, or the like using the resin composition or the resin modifier according to the present invention.

It is also possible to provide a laminate having an X layer containing the resin composition or the resin modifier according to the present invention and a Y layer laminated on at least one surface of the X layer. As the laminate, for example, laminated glass is suitable, and by using laminated glass in which the X layer is an interlayer film for laminated glass and the Y layer is glass, not only excellent vibration damping properties but also excellent sound insulation properties can be expected.

In addition to the glass layer, the Y layer may be appropriately selected depending on various applications, and examples thereof include a layer containing a thermoplastic resin other than the thermoplastic resin used in the resin composition or the resin modifier according to the present invention. Examples of the thermoplastic resin include polyvinyl acetal resins, ionomers, ethylene-vinyl acetate copolymers, urethane resins, and polyamide resins.

Other applications include pellets, veils, sound absorbing materials, sound insulating materials, dam rubbers, shoe sole materials, flooring materials, weather strips, floor mats, dash insulators, roof linings, door panels, engine head covers, door hole seals, fender liners, and the like, and these applications are also useful.

The resin composition or the resin modifier according to the present invention may also be used for various automobile members in the automobile field, for example, cooling parts such as thermostat housings, radiator tanks, radiator hoses, water outlets, water pump housings, and rear joints; intake and exhaust system parts such as intercooler tanks, intercooler cases, turbo duct pipes, EGR cooler cases, resonators, throttle bodies, intake manifolds, and tail pipes; fuel system components such as fuel delivery pipes, gasoline tanks, quick connectors, canisters, pump modules, fuel piping, oil strainers, lock nuts, and sealing materials; structural components such as mount brackets, torque rods, and cylinder head covers; drive system components such as bearing retainers, gear tensioners, headlamp actuator gears, HVAC gears, sliding door rollers, and clutch peripheral components; brake system components such as air brake tubes; on-vehicle electrical components such as wire harness connectors, motor components, sensors, ABS bobbins, combination switches, on-vehicle switches, and electronic control unit (ECU) boxes, in the engine room; and interior and exterior parts such as slide door dampers, door mirror stays, door mirror brackets, inner mirror stays, roof rails, engine mount brackets, inlet pipes of air cleaners, door checkers, plus chains, emblems, clips, breaker covers, cup holders, airbags, fenders, spoilers, radiator supports, radiator grills, louvers, air scoops, hood bulges, back doors, fuel sender modules, floor mats, instrument panels, dashboards, dash insulators, dam rubbers, weather strips, and tires.

In addition, the present invention may be applied to sealing materials, adhesives, pressure-sensitive adhesives, packings, O-rings, belts, soundproofing materials, and the like in various electric products such as televisions, various recorders such as Blu-ray recorders and HDD recorders, projectors, game machines, digital cameras, home videos, antennas, speakers, electronic dictionaries, IC recorders, FAXs, copiers, telephones, doorphones, rice cookers, microwave ovens, oven ranges, refrigerators, dishwashers, dish dryers, IH cooking heaters, hotplates, cleaners, washing machines, chargers, sewing machines, clothes irons, dryers, electric bicycles, air cleaners, water purifiers, electric toothbrushes, luminaires, air conditioners, outdoor units of air conditioners, dehumidifiers, and humidifiers. The resin composition or the resin modifier according to the present invention can also be used as a fiber.

EXAMPLES

Hereinafter, the present invention will be described in detail with reference to Examples and Comparative Examples, but the present invention is not limited thereto.

A method for evaluating the physical properties of a hydrogenated product of a block copolymer obtained in Production Examples described later is shown below.

(1) Content of Polymer Block (A-1)

The block copolymer before hydrogenation was dissolved in $CDCl_3$ and subjected to $^1$H-NMR measurement [apparatus: "ADVANCE 400 Nano bay" (manufactured by Bruker Corporation), measurement temperature: 30° C.], and the content of the polymer block (A-1) was calculated from the ratio of the peak intensity derived from styrene and the peak intensity derived from diene.

(2) Weight Average Molecular Weight (Mw)

The weight average molecular weight (Mw) in terms of polystyrene of the block copolymer or the hydrogenated product was determined by gel permeation chromatography (GPC) measurement under the following conditions.

(GPC Measurement Apparatus and Measurement Conditions)

Apparatus: GPC apparatus "HLC-8020" (manufactured by Tosoh Corporation)
  Separation column: "TSKgel GMHXL", "G4000HXL", and "G5000HXL" manufactured by Tosoh Corporation were connected in series.
  Eluent: tetrahydrofuran
  Eluent flow rate: 0.7 mL/min
  Sample concentration: 5 mg/10 mL
  Column temperature: 40° C.
  Detector: Differential refractive index (RI) detector
  Calibration curve: prepared using standard polystyrene (3) Hydrogenation Rate in Polymer Block (A-2)

The hydrogenation rate in the polymer block (A-2) was calculated from the ratio of the peak area derived from the residual olefin of isoprene and/or butadiene to the peak area derived from ethylene, propylene, and/or butylene by $^1$H-NMR measurement.

Apparatus: nuclear magnetic resonance apparatus "ADVANCE 400 Nano bay" (manufactured by Bruker Corporation).
  Solvent: $CDCl_3$ (4) Vinyl Bond Amount in Polymer Block (A-2)

The block copolymer before hydrogenation was dissolved in $CDCl_3$ and subjected to $^1$H-NMR measurement [apparatus: "ADVANCE 400 Nano bay" (manufactured by Bruker Corporation), measurement temperature: 30° C.]. From the ratio of the peak area corresponding to the 3,4-bond unit and the 1,2-bond unit in the isoprene structural unit and the 1,2-bond unit in the butadiene structural unit, or in the case of a structural unit derived from a mixture of isoprene and butadiene, the ratio of the peak area corresponding to each of the bond units to the total peak area of the structural units derived from isoprene and/or butadiene, the vinyl bond amount (total content of the 3,4-bond unit and the 1,2-bond unit) was calculated.

(5) Content of Alicyclic Skeleton (X) in Polymer Block (A-2)

600 mg of the block copolymer before hydrogenation and 40 mg of $Cr(acac)_3$ were dissolved in 4 mL of $CDCl_3$ and subjected to quantitative $^{13}$C-NMR measurement (pulse program: zgig, Inverse gated 1H decoupling method) [apparatus: "ADVANCE 400 Nano bay" (manufactured by Bruker Corporation), measurement temperature: 30° C.] using a 10 mm NMR tube, and the contents of each of the alicyclic skeletons X, X1, and X2 in the polymer block (A-2) were calculated by the following methods.

In Table 1, X, X1, and X2 represent the following alicyclic skeleton.

X: An alicyclic skeleton having a combination of the substituents of the following (i) to (vi)
X1: An alicyclic skeleton having a combination of the substituents of the following (i) and (iv)
X2: An alicyclic skeleton having a combination of the substituents of the following (ii), (iii), (v), and (iv)

(i): $R^1$=Hydrogen atom, $R^2$=Hydrogen atom, $R^3$=Hydrogen atom; (1,2Bd+Bd)
(ii): $R^1$=Hydrogen atom, $R^2$=Methyl group, $R^3$=Hydrogen atom; (1,2Bd+1,2Ip)=
(iii): Hydrogen atom, $R^2$=Hydrogen atom, $R^3$=Methyl group; (1,2Bd+3,4Ip)
(iv): $R^1$=Methyl group, $R^2$=Hydrogen atom, $R^3$=Hydrogen atom; (1,2Ip+Bd)
(v): $R^1$=Methyl group, $R^2$=Methyl group, $R^3$=Hydrogen atom; (1,2Ip+1,2Ip)
(vi); $R^1$=Methyl group, $R^2$=Hydrogen atom, $R^3$=Methyl group; (1,2Ip+3,4Ip)

Note that Ip represents isoprene and Bd represents butadiene.

[Calculation Method]

Each peak and the derived structure are shown in Table 1-1. Assuming that the integral value of each peak is a to g, the integral value of each structure is as shown in Table 1-2, and the contents of X, X1, and X2 can be calculated by $(a+g-c)/(a+b+c-d+e/2+2f)$, $(g-c)/(a+b+c-d+e/2+2f)$, and $a/(a+b+c-d+e/2+2f)$, respectively.

TABLE 1-1

| Peak (ppm) | Structure | Integral value |
| --- | --- | --- |
| 108-110 | X2 | a |
| 110-113 | 3,4Ip + 1,2Ip + X1 | b |
| 113-116 | 1,2Bd | c |
| 122-127 | 1,4Ip + St | d |
| 127-132 | 1,4Bd × 2 + St × 4 | e |
| 132-137 | 1,4Ip | f |
| 142-145 | 1,2Bd + X1 | g |

TABLE 1-2

| Structure | Integral value |
| --- | --- |
| St | d − f |
| 1,4Ip | f |
| 3,4Ip + 1,2Ip | b − (g − c) |
| 1,4Bd | (e − (d − f) × 4) / 2 |
| 1,2Bd | c |
| X1 | g − c |
| X2 | a |
| Total | a + b + c − d + e/2 + 2f |

(6) Peak Area Ratio of $^{13}$C-NMR

The hydrogenated products of Production Examples 1 to 5 were subjected to the quantitative $^{13}$C-NMR measurement [apparatus: "ADVANCE 400 Nano bay" (manufactured by Bruker Corporation), measurement temperature: 30° C., solvent: CDCl$_3$] to calculate the ratio of peak areas [the peak area at a chemical shift value of 50.0 to 52.0 ppm]/[the peak area at a chemical shift value of 43.0 to 45.0 ppm].

(7) Peak Top Temperature and Peak Top Intensity of Tan δ, Maximum Width of Temperature Range where Tan δ is 1.0 or More, and Tan δ Intensity at 20° C. and 30° C.

For the following measurements, a single-layer sheet having a thickness of 1.0 mm was produced by pressurizing the hydrogenated product of the block copolymer at a temperature of 230° C. and a pressure of 10 MPa for 3 minutes. The single-layer sheet was cut into a disk shape, which was used as a test sheet.

In the measurements, in accordance with JIS K 7244-10 (2005), a strain control type dynamic viscoelastometer "ARES-G2" (manufactured by TA Instruments Japan) having a disk diameter of 8 mm was used as a parallel plate vibration rheometer.

The space between the two flat plates was completely filled with the test sheet, vibration was applied to the test sheet at a frequency of 1 Hz with a strain amount of 0.1%, and the temperature was increased from −70° C. to +100° C. at a constant rate of 3° C./min. The temperature of the test sheet and the disk was maintained until there was no change in the measured values of the shear loss modulus and the shear storage modulus, and the maximum value of the peak intensity of tan δ (peak top intensity) and the temperature at which the maximum value was obtained (peak top temperature) were determined. Further, the maximum width of the temperature range where tan δ was 1.0 or more, and the tan δ intensity at 20° C. and 30° C. were determined. The larger the value, the more excellent the vibration damping properties.

(8) Glass Transition Temperature and Melting Point of Resin

The glass transition temperatures and melting points of the resins were measured using a DSC measuring apparatus (DSC6200, manufactured by Hitachi High-Tech Science Corporation) under the conditions of a temperature range of −100° C. to +350° C. and a heating rate of 20° C./min. The temperature at the inflection point of the baseline shift due to the glass transition was taken as the glass transition point, and the temperature at the position where the endothermic peak was at the top was taken as the melting point. It was confirmed that at least one of the glass transition temperatures and melting points of nylon 6, PBT, and POM described later was 80° C. or higher for all resins.

Production Example 1

(Production of Hydrogenated Product of Block Copolymer (TPE-1))

A nitrogen-purged and dried pressure-resistant container was charged with 50 kg of cyclohexane as a solvent and 76 g of cyclohexane solution of sec-butyllithium having a concentration of 10.5% by mass as an anionic polymerization initiator (substantial addition amount of sec-butyllithium: 8.0 g).

After the temperature in the pressure-resistant container was raised to 50° C., 1.0 kg of styrene (1) was added and polymerized for 1 hour, and 63 g of 2,2-di(2-tetrahydrofuryl) propane (DTHFP) was added as a Lewis base at a temperature in container of 50° C., a liquid mixture of 8.16 kg of isoprene and 6.48 kg of butadiene was added over 5 hours at an average diene feed rate shown in Table 2, and then the mixture was polymerized for 2 hours, and 1.0 kg of styrene (2) was further added and polymerized for 1 hour, thereby obtaining a reaction liquid containing a polystyrene-poly (isoprene/butadiene)-polystyrene triblock copolymer.

A Ziegler-based hydrogenation catalyst formed from nickel octylate and trimethylaluminum was added to the reaction liquid under a hydrogen atmosphere, and the reaction was carried out at 80° C. under a hydrogen pressure of 1 MPa for 5 hours. After allowing the reaction liquid to cool and release the pressure, the catalyst was removed by washing with water, and vacuum drying was performed to obtain a hydrogenated product of a polystyrene-poly(isoprene/butadiene)-polystyrene triblock copolymer (hereinafter referred to as TPE-1).

The raw materials and the used amounts thereof are shown in Table 2. The results of the evaluation of physical properties are shown in Table 3.

Production Example 2

(Production of Hydrogenated Product of Block Copolymer (TPE-2))

A hydrogenated product of polystyrene-polyisoprene-polystyrene triblock copolymer (hereinafter referred to as TPE-2) was obtained in the same manner as in Production Example 1, except that the components, the used amounts thereof, and the reaction conditions were changed as shown in Table 2. The results of the evaluation of physical properties are shown in Table 3.

Production Example 3

(Production of Hydrogenated Product of Block Copolymer (TPE-3))

A hydrogenated product of polystyrene-polybutadiene-polystyrene triblock copolymer (hereinafter referred to as TPE-3) was obtained in the same manner as in Production Example 1, except that the components, the used amounts thereof, and the reaction conditions were changed as shown in Table 2. The results of the evaluation of physical properties are shown in Table 3.

Production Example 4

(Production of Hydrogenated Product of Block Copolymer (TPE-4))

A hydrogenated product of polystyrene-polyisoprene-polystyrene triblock copolymer (hereinafter referred to as TPE-4) was obtained in the same manner as in Production Example 1, except that the components, the used amounts thereof, and the reaction conditions were changed as shown in Table 2. The results of the evaluation of physical properties are shown in Table 3.

Production Example 5

(Production of Hydrogenated Product of Block Copolymer (TPE-5))

A hydrogenated product of polystyrene-polyisoprene-polystyrene triblock copolymer (hereinafter referred to as TPE-5) was obtained in the same manner as in Production Example 1, except that the components, the used amounts thereof, and the reaction conditions were changed as shown in Table 2. The results of the evaluation of physical properties are shown in Table 3.

TABLE 2

|  |  | Production Example | | | | |
| --- | --- | --- | --- | --- | --- | --- |
|  |  | 1 | 2 | 3 | 4 | 5 |
| Block copolymer or the hydrogenated product | | TPE-1 | TPE-2 | TPE-3 | TPE-4 | TPE-5 |
| Used amount (kg) | Cyclohexane | 50 | 50 | 50 | 50 | 50 |
|  | Sec-butyl lithium (10.5% by mass cyclohexane solution) | 0.076 | 0.087 | 0.25 | 0.101 | 0.124 |
|  | (A-1) Styrene (1) | 1.0 | 1.0 | 3.2 | 1.7 | 4.1 |
|  | Styrene (2) | 1.0 | 1.0 | 3.2 | 1.7 | 4.1 |
|  | (A-2) Isoprene | 8.16 | 14.64 | 0 | 13.3 | 4.4 |
|  | Butadiene | 6.48 | 0 | 15.0 | 0 | 0 |
|  | Lewis base Tetrahydrofuran | 0 | 0 | 0.09 | 0.29 | 0 |
|  | DTHFP | 0.063 | 0.032 | 0 | 0 | 0 |
| Reaction conditions | Diene polymerization temperature (° C.) | 50 | 40 | 50 | 40 | 50 |
|  | Diene feed time (h) | 5 | 5 | 5 | 5 | 5 |
|  | Average diene feed rate per 1 mol of active end (kg/h) | 20.5 | 20.5 | 8 | 11.9 | 8 |

TABLE 3

|  | Production Example | | | | |
| --- | --- | --- | --- | --- | --- |
|  | 1 | 2 | 3 | 4 | 5 |
| Block copolymer or the hydrogenated product used | TPE-1 | TPE-2 | TPE-3 | TPE-4 | TPE-5 |
| Structural unit of polymer block (A-1) | St | St | St | St | St |
| Components constituting polymer block (A-2) | Ip/Bd | Ip | Bd | Ip | Ip |
| Mass ratio of components constituting polymer block (A-2) | 55/45 | 100 | 100 | 100 | 100 |
| Molar ratio of components constituting polymer block (A-2) | 50/50 | 100 | 100 | 100 | 100 |
| Polymer structure | A-1/A-2/A-1 (A/B/A) | A-1/A-2/A-1 (A/B/A) | A-1/A-2/A-1 (A/B/A) | A-1/A-2/A-1 (A/B/A) | A-1/A-2/A-1 (A/B/A) |
| Content of polymer block (A-1) (% by mass) | 12 | 12 | 30 | 20 | 65 |
| Weight average molecular weight of block copolymer or the hydrogenated product | 185,000 | 150,000 | 75,000 | 125,000 | 80,000 |
| Hydrogenation rate (mol %) in polymer block (A-2) | 95 | 86 | 99 | 90 | 99 |
| Vinyl bond amount (mol %) in polymer block (A-2) | 76 | 83 | 40 | 60 | 7 |
| Content (mol %) of X1 or the hydrogenated product of X1 in block (A-2) | 5 | 0 | 0 | 0 | 0 |
| Content (mol %) of X2 or the hydrogenated product of X2 in block (A-2) | 9.9 | 5.2 | 0 | 0 | 0 |
| Content (mol %) of X or the hydrogenated product of X in the block (A-2) | 14.9 | 5.2 | 0 | 0 | 0 |
| Area ratio of $^{13}$C-NMR after hydrogenation [peak area of 50 to 52 ppm]/[peak area of 43 to 45 ppm] | 0.21 | 0 | 0 | 0 | 0 |
| Glass transition temperature (° C.) | 5 | 20 | −53 | −15 | 90 |
| Peak top temperature (° C.) of tan δ | 14.9 | 31.9 | −55 | −7 | 95 |
| Peak top intensity of tan δ | 2.24 | 2.20 | 0.4 | 2.2 | 1.6 |
| Maximum width (° C.) of a temperature range in which tan δ ≥ 1 | 17.9 | 20.7 | 0 | 12.4 | 10.2 |
| Tan δ intensity at 20° C. and 1 Hz | 1.70 | 0.29 | 0.03 | 0.21 | 0.04 |
| Tan δ intensity at 30° C. and 1 Hz | 0.81 | 2.03 | 0.03 | 0.14 | 0.05 |

The hydrogenated products of the block copolymers of Production Examples 1, 2, 4, and 5 exhibit a peak top intensity of tan δ of 1.0 or more, and have a wide temperature range in which tan δ≥1.0, and thus can be said to be suitable for a wide range of applications as vibration damping materials. In particular, comparison with Production Example 3 shows that Production Examples 1, 2, 4, and 5 have high tan δ intensity at 20° C. and 30° C. and are excellent in vibration damping properties at around room temperature. In particular, the hydrogenated products of the block copolymers of Production Examples 1, 2, and 4 exhibit higher values of tan δ intensity at 20° C. and 30° C., and are found to be more excellent in vibration damping properties at around room temperature. In addition, the hydrogenated product of the block copolymer of Production Example 5 has a high peak top temperature of tan δ and is excellent in vibration damping properties at a high temperature.

<Preparation of Modified Hydrogenated Products>
(Modified TPE-1)

TAFMER MH5020 manufactured by Mitsui Chemicals, Inc., which is a maleic anhydride-modified ethylene-butene copolymer, was used as the modified hydrogenated product. This is referred to as modified TPE-1. The maleic anhydride-modified amount of the modified TPE-1 was 1.0 phr.

(Modified TPE-2)

The hydrogenated product TPE-3 obtained above was maleic anhydride-modified by the following procedure to obtain a modified hydrogenated product (modified TPE-2) having a maleic anhydride-modified amount of 0.6 phr.

Using a twin-screw extruder "ZSK26mc" (26 mmφ, L/D=56) manufactured by Coperion Co., Ltd., under the following extrusion conditions, 10 kg of the hydrogenated block copolymer TPE-3 obtained above was put into a molten state, and 0.01 kg of 2,5-dimethyl-2,5-di(t-butylperoxy)hexane (perhexa 25B-40, manufactured by NOF Corporation) as a radical initiator and 0.1 kg of maleic anhydride as a modifier were blended to perform a modification reaction to obtain a modified hydrogenated product.

<Extrusion Conditions>
Temperature setting of twin-screw extruder: resin feed port 40° C., cylinder inlet 150° C., adapter 210° C., die 210° C.
Screw rotation speed: 300 rpm
(Modified TPE-3)
According to the same procedure for preparing the modified TPE-2, except that the amount of the radical initiator was 0.03 kg and the amount of the maleic acid anhydride was 0.3 kg, a modified hydrogenated product having a maleic acid anhydride-modified amount of 2.1 phr was obtained.
(Modified TPE-4)
Epofriend AT501 manufactured by Daicel Corporation, which is an epoxidized product of a styrene-butadiene block copolymer, was used as modified TPE-4.
(Modified TPE-5)
The same procedure for the preparation of modified TPE-2 was followed except that TPE-1 was used as the hydrogenated product and the amount of the radical initiator was 0.05 kg, to obtain a modified hydrogenated product having a maleic anhydride-modified amount of 0.7 phr.
<Resin Composition>

[Examples 1 to 10] and [Comparative Examples 1 and 2]

According to the mix proportions shown in Table 4, the hydrogenated products of the block copolymers TPE-1 and TPE-2 obtained above, the modified hydrogenated products of the block copolymers (modified TPE-1 to modified TPE-3) obtained above, modified polyethylene wax-1 and modified polyethylene wax-2, and nylon 6 (UBE Nylon 1013B, manufactured by Ube Industries, Ltd.) were melt-kneaded using a twin-screw extruder "ZSK26mc" (26 mmφ, L/D=56) manufactured by Coperion Co., Ltd. under the following extrusion conditions to prepare the resin compositions of Examples 1 to 10 and Comparative Examples 1 and 2. Except for Examples 3 and 8 to 10 and Comparative Examples 1 and 2, components other than nylon 6 were pre-kneaded using the above-described apparatus under the following pre-kneading conditions, and the obtained composition and nylon 6 were melt-kneaded. Nylon 6 had a melting point of 215 to 225° C.
<Extrusion Conditions>
Temperature setting of twin-screw extruder: resin feed port 40° C., cylinder inlet 250° C., adapter 250° C., die 250° C.
Screw rotation speed: 300 rpm
<Pre-Kneading Conditions>
Temperature setting of twin-screw extruder: resin feed port 40° C., cylinder inlet 180° C., adapter 210° C., die 210° C.
Screw rotation speed: 300 rpm
As the modified polyethylene wax-1, Hi-WAX 2203A (acid-modified type, acid value 30 mgKOH/g) manufactured by Mitsui Chemicals, Inc. was used. As the modified polyethylene wax-2, Hi-WAX 4202E (oxidized type, acid value 17 mgKOH/g) manufactured by Mitsui Chemicals, Inc. was used.
The TPE-1 and the TPE-2 correspond to the thermoplastic resin (A), the modified TPE-1 to the modified TPE-3, the modified polyethylene wax-1 and the modified polyethylene wax-2 correspond to the thermoplastic resin (B), and the nylon 6 corresponds to the polar resin (C), respectively.
The measurement results are shown in Table 4 below. For reference, Table 4 also shows measurement data in the case of using only nylon 6 as Reference Example 1. In Table 4, "Y" indicates the case where the components other than nylon 6 were pre-kneaded, and "_" indicates the case where the components other than nylon 6 were not pre-kneaded.

[Examples 11 to 17] and [Comparative Example 3]

According to the mix proportions shown in Table 5, the hydrogenated products of the block copolymers TPE-1 and TPE-4 obtained above, the modified hydrogenated products of the block copolymers (modified TPE-1, modified TPE-3, and modified TPE-4) obtained above, modified resin-1 and modified resin-2, and polybutylene terephthalate resin (Toraycon 1401X31 manufactured by Toray Industries, Inc.) which is a thermoplastic resin were melt-kneaded using a twin-screw extruder "ZSK26mc" (26 mmφ, L/D=56) manufactured by Coperion Co., Ltd. under the following extrusion conditions to prepare the resin compositions of Examples 11 to 17 and Comparative Example 3. The polybutylene terephthalate resin had a melting point of 225° C.
<Extrusion Conditions>
Temperature setting of twin-screw extruder: resin feed port 40° C., cylinder inlet 250° C., adapter 250° C., die 250° C.
Screw rotation speed: 300 rpm
As the polybutylene terephthalate resin, Toraycon 1401X31 manufactured by Toray Industries, Inc. was used. As the modified resin-1, ethylene-glycidyl methacrylate copolymer Bondfast BF-7M, manufactured by Sumitomo Chemical Company, Limited was used. As the modified resin-2, ethylene-glycidyl methacrylate copolymer Bondfast BF-E, manufactured by Sumitomo Chemical Company, Limited was used. As the modified TPE-4, an epoxidized product of a styrene-butadiene block copolymer Epofriend AT501, manufactured by Daicel Corporation was used.
The measurement results are shown in Table 5 below. In Table 5, the polybutylene terephthalate resin is abbreviated as "PBT". The TPE-1 and the TPE-4 correspond to the thermoplastic resin (A), the modified TPE-1, the modified TPE-3, the modified TPE-4, the modified resin-1 and the modified resin-2 correspond to the thermoplastic resin (B), and the PBT corresponds to the polar resin (C), respectively. For reference, Table 5 also shows measurement data in the case of using only PBT as Reference Example 2.

[Examples 18 and 19] and [Comparative Example 4]

According to the mix proportions shown in Table 6, the hydrogenated product of the block copolymer TPE-1 obtained above, Duracon (registered trademark) M90-44 manufactured by Polyplastics Co., Ltd., which is a polyacetal resin, Elastollan C80A manufactured by BASF Corporation, which is a thermoplastic polyurethane elastomer, and TU-polymer S5265 manufactured by Kuraray Co., Ltd., which is a block copolymer in which a styrene-based elastomer and one polyurethane elastomer block are bonded, were melt-kneaded using a twin-screw extruder "ZSK26mc" (26 mmφ, L/D=56) manufactured by Coperion Co., Ltd. under the following extrusion conditions to prepare the resin compositions of Examples 18 and 19 and Comparative Example 4. The polyacetal resin had a melting point of 165° C.

<Extrusion Conditions>
Temperature setting of twin-screw extruder: resin feed port 40° C., cylinder inlet 200° C., adapter 200° C., die 200° C.
Screw rotation speed: 300 rpm As the polyacetal resin, Duracon (registered trademark) M90-44 manufactured by Polyplastics Co., Ltd. was used.

The measurement results are shown in Table 6 below. In Table 6, the above Duracon M90-44 is abbreviated as "POM", Elastollan C80A is abbreviated as "TPU-1", and S5265 is abbreviated as "TPU-2". The TPE-1 corresponds to the thermoplastic resin (A), the TPU-1 and the TPU-2 correspond to the thermoplastic resin (B), and the POM corresponds to the polar resin (C), respectively. For reference, Table 6 also shows measurement data in the case of using only POM as Reference Example 3.

Examples 20 to 23

According to the mix proportions shown in Table 7, the hydrogenated product of the block copolymer TPE-1 obtained above, the modified TPE-4, the modified resin-1 and the modified resin-2, and a polyester-based thermoplastic elastomer (hereinafter referred to as TPEE) were melt-kneaded using a twin-screw extruder "ZSK26mc" (26 mmφ, L/D=56) manufactured by Coperion Co., Ltd. under the following extrusion conditions to prepare the resin compositions of Examples 20 to 23.
<Extrusion Conditions>
Temperature setting of twin-screw extruder: resin feed port 40° C., cylinder inlet 200° C., adapter 200° C., die 200° C.
Screw rotation speed: 300 rpm As the TPEE, Hytrel 3046 (registered trademark) manufactured by Du Pont-Toray Co., Ltd. was used. The modified resin-1, the modified resin-2, and the modified TPE-4 were the same as those shown in Table 5.

The measurement results are shown in Table 7 below. The TPE-1 corresponds to the thermoplastic resin (A), the modified resin-1, the modified resin-2, and the modified TPE-4 correspond to the thermoplastic resin (B), and the TPEE corresponds to the polar resin (C), respectively. For reference, Table 7 also shows measurement data in the case of using only TPEE as Reference Example 4.

[Examples 24 to 29] and [Comparative Example 5]

According to the mix proportions shown in Table 8, the hydrogenated products of the block copolymers TPE-1, TPE-2, and TPE-5 obtained above, the modified TPE-2 and the modified TPE-5 obtained above, a modified polypropylene (modified PP), glass fibers, nylon 6, and the modified polyethylene wax-1 were melt-kneaded using a twin-screw extruder "ZSK26mc" (26 mmφ, L/D=56) manufactured by Coperion Co., Ltd. under the following extrusion conditions to prepare the resin compositions of Examples 24 to 29 and Comparative Example 5.
<Extrusion Conditions>
Temperature setting of twin-screw extruder: resin feed port 40° C., cylinder inlet 250° C., adapter 250° C., die 250° C.
Screw rotation speed: 300 rpm As the nylon 6, UBE Nylon 1013B manufactured by Ube Industries, Ltd. was used. As the glass fibers, chopped strand T-251H manufactured by Nippon Electric Glass Co., Ltd. was used. The modified polyethylene wax-1 used was the same as shown in Table 4. As the modified PP, Admer QE840 manufactured by Mitsui Chemicals, Inc. was used.

The measurement results are shown in Table 8 below. The TPE-1, the TPE-2, and the TPE-5 correspond to the thermoplastic resin (A), the modified TPE-2, the modified TPE-5, the modified PP, and the modified polyethylene wax-1 correspond to the thermoplastic resin (B), the nylon 6 corresponds to the polar resin (C), and the glass fibers corresponds to the additive, respectively. For reference, Table 8 also shows measurement data in the case of using only nylon 6 and glass fibers as Reference Example 5.

[Examples 30 to 32] and [Comparative Example 6]

According to the mix proportions shown in Table 9, a PPS resin, the hydrogenated products of the block copolymers TPE-1 and TPE-2 obtained above, and modified resin-3 and modified resin-4 were melt-kneaded using a twin-screw extruder "ZSK26mc" (26 mmφ, L/D=56) manufactured by Coperion Co., Ltd. under the following extrusion conditions to prepare the resin compositions of Examples 30 to 32 and Comparative Example 6.
<Extrusion Conditions>
Temperature setting of twin-screw extruder: resin feed port 40° C., cylinder inlet 280° C., adapter 300° C., die 300° C.
Screw rotation speed: 300 rpm As the PPS resin, Torelina A900 manufactured by Toray Industries, Inc. was used. Further, as the modified resin-3, an epoxy group-containing acrylic-styrene polymer "Marproof G-0130SP" manufactured by NOF Corporation was used. As the modified resin-4, a styrene-2-isopropenyl-2-oxazoline copolymer "Epocros RPS-1005" manufactured by Nippon Shokubai Co., Ltd. was used.

The measurement results are shown in Table 9 below. The TPE-1 and TPE-2 correspond to the thermoplastic resin (A), the modified resin-3 and modified resin-4 correspond to the thermoplastic resin (B), and the PPS resin corresponds to the polar resin (C), respectively. For reference, Table 9 also shows measurement data in the case of using only the PPS resin as Reference Example 6.
[Evaluation of Physical Properties]

The evaluation of physical properties of the resin compositions prepared above is shown below. The IZOD impact strength was measured for Examples 1 to 10, Comparative Examples 1 and 2, and Reference Example 1. The volume average dispersion diameter of the molded article in which no core-shell structure was observed was not measured.
(Loss Factor at 0° C., 10° C., 20° C., 40° C., 60° C., 80° C., and 100° C.)

The obtained resin composition was injection-molded by an injection molding machine ("EC75SX", manufactured by Toshiba Machine Co., Ltd.) to prepare a sheet having a length of 200 mm, a width of 40 mm, and a thickness of 2 mm. This sheet was cut into a size having a length of 200 mm, a width of 10 mm, and a thickness of 2 mm, and a contact chip was bonded to the center portion using an adhesive containing α-cyanoacrylate as a main component to obtain a sample.

Next, the sample was set in a loss factor measurement system (manufactured by Brüel & Kjaer Co., Ltd., exciter 4809 type; impedance head 80001 type).

A contact chip bonded to the center portion of the sample was attached to the tip portion of an excitation force detector incorporated in the impedance head. Vibration was applied to the center portion of the laminate in a range of frequencies of 0 to 8,000 Hz, and a damping test was performed by a central exciting method in accordance with JIS K 7391 (2008) by detecting the exciting force and acceleration waveform at this point and the exciting force in the center portion and an acceleration signal showing the acceleration waveform were detected. Each sample was measured at temperatures of 0° C., 10° C., 20° C., 40° C., 60° C., 80° C., and 100° C.

Based on the obtained exciting force and a velocity signal obtained by integrating the acceleration signal, the mechanical impedance of the excitation point (the central portion of the sample to which vibration was applied) was obtained. Then, an impedance curve was prepared in which the horizontal axis represents frequencies and the vertical axis represents the mechanical impedance, and the loss factor of the sample at each temperature was obtained from the full width at half maximum of the second peak (2nd mode) counted from the low-frequency side.

The larger the value of the loss factor, the higher the damping effect. The results are shown in Tables 4 to 9.

(Volume Average Dispersion Diameter)

The test piece used for the measurement of the loss factor was freeze-fractured using liquid nitrogen, and the cross section was etched with xylene and then vapor-deposited with platinum to prepare a sample, which was observed with an SEM. In the obtained image, an average value of diameters of 50 pores removed by etching was defined as a volume average dispersion diameter. The results are shown in Tables 4 to 9. When the pores have a flat shape such as an ellipse, the average value of the major axis was used as the volume average dispersion diameter.

(Formation of Core-Shell Structure)

The obtained resin composition was injection-molded by an injection molding machine ("EC75SX", manufactured by Toshiba Machine Co., Ltd.) to prepare a sheet having a length of 200 mm, a width of 40 mm, and a thickness of 2 mm. This sheet was cut into a size having a length of 200 mm, a width of 10 mm, and a thickness of 2 mm to obtain a test piece. When a cross section of the test piece was observed with a transmission electron microscope (TEM), a core-shell structure in which any one of the modified TPE-1 to the modified TPE-5, the modified polyethylene wax-1 and the modified polyethylene wax-2, the modified resin-1 to the modified resin-4, the TPU-1 and the TPU-2, and the modified PP served as a shell and at least any one of the hydrogenated products TPE-1 to TPE-5 served as a core was observed, "Y" was given, and when the above structure was not observed, "-" was given. The test piece was embedded in an epoxy resin after cutting, and was ultra-thinned to about 100 μm, stained with ruthenium tetroxide, and subjected to cross-sectional observation. The results are shown in Tables 4 to 9. FIG. 2 shows an enlarged cross-sectional photograph of Example 6, and FIG. 4 shows an enlarged cross-sectional photograph of Example 2, when observed using a TEM.

(Appearance of Molded Article)

The obtained resin composition was injection-molded by an injection molding machine ("EC75SX", manufactured by Toshiba Machine Co., Ltd.) to prepare a sheet having a length of 200 mm, a width of 40 mm, and a thickness of 2 mm. This sheet was cut into a size having a length of 200 mm, a width of 10 mm, and a thickness of 2 mm to obtain a molded article. The appearance of the molded article was visually confirmed, and when an appearance defect such as surface peeling occurred, it was evaluated as "C", and when there was no appearance defect, it was evaluated as "A". The results are shown in Tables 4 to 6 and 8.

(IZOD Impact Strength)

The obtained resin composition was injection-molded into a length of 10 mm, a width of 80 mm, and a thickness of 4 mm by an injection molding machine ("EC75SX", manufactured by Toshiba Machine Co., Ltd.), and notch cutting was performed in accordance with JIS K 7110 to obtain a test piece. After the test piece was stored at 23° C. for 16 hours, IZOD impact strength was measured by an impact strength measuring device. The results are shown in Table 4.

(Extrusion Processability)

In Examples 3 to 7 and Comparative Examples 2 and 3, when the strands coming out of the twin-screw extruder were pelletized using a pelletizer (water-cooled pelletizer KM-150N, manufactured by Katu Seisakusho Co., Ltd.), the case where pellets could be obtained was evaluated as "A", and the case where pellets could not be obtained due to poor cutting of the strands was evaluated as "C". The results are shown in Table 9.

TABLE 4

| | | Ref. Ex. 1 | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|---|
| Resin composition (part by mass) | Nylon 6 | 100 | 90 | 90 | 90 | 90 | 90 | 90 | 90 | 90 | 90 | 90 | 95 | 95 |
| | TPE-1 | — | 6 | — | — | — | — | — | — | 10 | — | — | — | — |
| | TPE-2 | — | — | 6 | 6 | 8 | 4 | 6 | 6 | — | 10 | 10 | 5 | — |
| | Modified TPE-1 | — | 4 | 4 | 4 | 2 | 6 | — | — | — | — | — | — | 5 |
| | Modified TPE-2 | — | — | — | — | — | — | 4 | — | — | — | — | — | — |
| | Modified TPE-3 | — | — | — | — | — | — | — | 4 | — | — | — | — | — |
| | Modified polyethylene wax-1 | — | — | — | — | — | — | — | — | — | 2 | 2 | — | — |
| | Modified polyethylene wax-2 | — | — | — | — | — | — | — | — | — | — | 2 | — | — |
| Pre-kneading other than nylon 6 | | — | Y | Y | — | Y | Y | Y | Y | — | — | — | — | — |
| Volume average dispersion diameter (μm) | | — | 0.7 | 0.7 | 1.6 | 1.5 | 0.5 | 0.4 | 0.7 | 1.5 | 1.7 | 2.1 | 3 | 0.3 |
| Formation of core-shell structure | | — | Y | Y | Y | Y | Y | Y | Y | Y | Y | Y | — | — |

TABLE 4-continued

|  | Ref. Ex. 1 | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|
| IZOD impact strength (J/m) | 15 | 26 | 24 | 18 | 15 | 41 | 35 | 20 | 20 | 17 | 16 | 9 | 51 |
| Molded article appearance | A | A | A | A | A | A | A | A | A | A | A | C | A |
| Loss factor (0° C.) | 0.02 | 0.03 | 0.02 | 0.02 | 0.02 | 0.02 | 0.02 | 0.02 | 0.04 | 0.02 | 0.02 | 0.02 | 0.02 |
| Loss factor (20° C.) | 0.02 | 0.04 | 0.03 | 0.03 | 0.03 | 0.03 | 0.03 | 0.03 | 0.06 | 0.04 | 0.04 | 0.02 | 0.02 |
| Loss factor (40° C.) | 0.02 | 0.03 | 0.04 | 0.04 | 0.05 | 0.03 | 0.04 | 0.04 | 0.04 | 0.06 | 0.06 | 0.03 | 0.02 |

TABLE 5

|  |  | Reference Example 2 | Example 11 | Example 12 | Example 13 | Example 14 | Example 15 | Example 16 | Example 17 | Comparative Example 3 |
|---|---|---|---|---|---|---|---|---|---|---|
| Resin composition (part by mass) | PBT | 100 | 90 | 90 | 90 | 90 | 90 | 90 | 90 | 95 |
|  | TPE-1 | — | 5 | 5 | 10 | 10 | 10 | 10 | — | 5 |
|  | TPE-4 | — | — | — | — | — | — | — | 10 | — |
|  | Modified TPE-1 | — | 5 | — | — | — | — | — | — | — |
|  | Modified TPE-3 | — | — | 5 | — | — | — | — | — | — |
|  | Modified TPE-4 | — | — | — | 3 | — | — | — | — | — |
|  | Modified resin-1 | — | — | — | — | 1 | 3 | — | 3 | — |
|  | Modified resin-2 | — | — | — | — | — | — | 3 | — | — |
| Volume average dispersion diameter (μm) |  | — | 4 | 2 | 3 | 3 | 4 | 6 | 4 | 15 |
| Formation of core-shell structure |  | — | Y | Y | Y | Y | Y | Y | Y | — |
| Molded article appearance |  | A | A | A | A | A | A | A | A | C |
| Loss factor (0° C.) |  | 0.01 | 0.02 | 0.02 | 0.03 | 0.03 | 0.03 | 0.03 | 0.05 | 0.01 |
| Loss factor (20° C.) |  | 0.01 | 0.03 | 0.03 | 0.05 | 0.05 | 0.05 | 0.05 | 0.02 | 0.02 |
| Loss factor (40° C.) |  | 0.01 | 0.02 | 0.02 | 0.02 | 0.02 | 0.02 | 0.02 | 0.01 | 0.01 |

TABLE 6

|  |  | Reference Example 3 | Example 18 | Example 19 | Comparative Example 4 |
|---|---|---|---|---|---|
| Resin composition (part by mass) | POM | 100 | 90 | 90 | 95 |
|  | TPE-1 | — | 5 | 5 | 5 |
|  | TPU-1 | — | 5 | — | — |
|  | TPU-2 | — | — | 5 | — |
| Volume average dispersion diameter (μm) |  | — | 5 | 2 | 13 |
| Formation of core-shell structure |  | — | Y | Y | — |
| Molded article appearance |  | A | A | A | C |
| Loss factor (0° C.) |  | 0.02 | 0.03 | 0.03 | 0.02 |
| Loss factor (20° C.) |  | 0.02 | 0.05 | 0.05 | 0.03 |
| Loss factor (40° C.) |  | 0.02 | 0.03 | 0.03 | 0.02 |

TABLE 7

|  |  | Reference Example 4 | Example 20 | Example 21 | Example 22 | Example 23 |
|---|---|---|---|---|---|---|
| Resin composition (part by mass) | TPEE | 100 | 80 | 80 | 80 | 80 |
|  | TPE-1 | — | 20 | 20 | 20 | 20 |
|  | Modified resin-1 | — | 3 | 5 | — | — |
|  | Modified resin-2 | — | — | — | 3 | — |
|  | Modified TPE-4 | — | — | — | — | 3 |
| Volume average dispersion diameter (μm) |  | — | 5 | 5 | 8 | 5 |
| Formation of core-shell structure |  | — | Y | Y | Y | Y |
| Loss factor (0° C.) |  | 0.07 | 0.10 | 0.10 | 0.11 | 0.09 |
| Loss factor (10° C.) |  | 0.05 | 0.28 | 0.29 | 0.27 | 0.26 |
| Loss factor (20° C.) |  | 0.03 | 0.30 | 0.27 | 0.27 | 0.28 |
| Loss factor (30° C.) |  | 0.03 | 0.17 | 0.15 | 0.16 | 0.15 |
| Loss factor (40° C.) |  | 0.03 | 0.09 | 0.08 | 0.07 | 0.09 |

TABLE 8

|  |  | Reference Example 5 | Example 24 | Example 25 | Example 26 | Example 27 | Example 28 | Example 29 | Comparative Example 5 |
|---|---|---|---|---|---|---|---|---|---|
| Resin composition (part by mass) | Nylon 6 | 65 | 50 | 55 | 50 | 50 | 50 | 50 | 50 |
| | Glass fiber | 35 | 35 | 35 | 35 | 35 | 35 | 35 | 35 |
| | TPE-1 | — | 15 | — | — | — | — | 15 | — |
| | TPE-2 | — | — | 10 | 15 | 15 | 5 | — | 15 |
| | TPE-5 | — | — | — | — | — | 5 | — | — |
| | Modified PP | — | — | — | — | — | — | 3 | — |
| | Modified TPE-2 | — | 3 | 2 | 3 | — | — | — | — |
| | Modified TPE-5 | — | — | — | — | — | 5 | — | — |
| | Modified polyethylene wax-1 | — | — | — | — | 3 | — | — | — |
| Volume average dispersion diameter (μm) | | — | 2.0 | 1.5 | 2.1 | 3.5 | 1.5 | 1.8 | 7.0 |
| Formation of core-shell structure | | — | Y | Y | Y | Y | Y | Y | — |
| Molded article appearance | | A | A | A | A | A | A | A | C |
| Loss factor (20° C.) | | 0.05 | 0.07 | 0.05 | 0.05 | 0.05 | 0.05 | 0.07 | 0.05 |
| Loss factor (40° C.) | | 0.05 | 0.08 | 0.06 | 0.07 | 0.07 | 0.06 | 0.08 | 0.07 |
| Loss factor (60° C.) | | 0.05 | 0.06 | 0.07 | 0.08 | 0.08 | 0.06 | 0.06 | 0.08 |
| Loss factor (80° C.) | | 0.04 | 0.05 | 0.05 | 0.06 | 0.06 | 0.06 | 0.05 | 0.06 |
| Loss factor (100° C.) | | 0.04 | 0.04 | 0.05 | 0.05 | 0.05 | 0.05 | 0.04 | 0.05 |

TABLE 9

|  |  | Reference Example 6 | Example 30 | Example 31 | Example 32 | Comparative Example 6 |
|---|---|---|---|---|---|---|
| Resin composition (part by mass) | PPS | 100 | 90 | 90 | 90 | 90 |
| | TPE-1 | — | 10 | 10 | — | 10 |
| | TPE-2 | — | — | — | 10 | — |
| | Modified resin-3 | — | 3 | — | 3 | — |
| | Modified resin-4 | — | — | 3 | — | — |
| Extrusion processability | | A | A | A | A | C |
| Volume average dispersion diameter (μm) | | — | 5 | 4 | 5 | — |
| Formation of core-shell structure | | — | Y | Y | Y | — |
| Loss factor (0° C.) | | 0.004 | 0.017 | 0.013 | 0.010 | — |
| Loss factor (20° C.) | | 0.003 | 0.027 | 0.023 | 0.014 | — |
| Loss factor (40° C.) | | 0.003 | 0.014 | 0.010 | 0.025 | — |
| Loss factor (60° C.) | | 0.003 | 0.009 | 0.008 | 0.013 | — |
| Loss factor (80° C.) | | 0.003 | 0.009 | 0.009 | 0.009 | — |

It can be seen from Table 4 that in the molded articles using the resin compositions of Examples 1 to 10, a core-shell structure is formed, and the values of the loss factor at 20° C. and 40° C. are equal to or greater than the values of Comparative Examples 1 and 2 and Reference Example 1.

In addition, in the molded articles using the resin compositions of Examples 1 to 10, it can be seen that the appearance of the molded article is superior, the volume average dispersion diameter is small, and the IZOD impact strength is large as compared to Comparative Example 1.

On the other hand, in the molded articles using the resin compositions of Comparative Examples 1 and 2 and Reference Example 1, a core-shell structure is not formed, and the values of the loss factor at 20° C. are smaller than the values of Examples 1 to 10, and the values of the loss factor at 40° C. are also equal to or smaller than the values of Examples 1 to 10. Further, it can be seen that in Comparative Example 1, the appearance of the molded article is inferior, the volume average dispersion diameter is large, and the IZOD impact strength is small as compared to Examples 1 to 10. That is, it can be seen that Comparative Examples 1 and 2 are inferior to Examples 1 to 10 in dispersibility of the thermoplastic resin (A) in the polar resin (C).

It can be seen from Table 5 that in the molded articles using the resin compositions of Examples 11 to 17, a core-shell structure is formed, and the values of the loss factor at 20° C. and 40° C. are equal to or greater than the values of Comparative Example 3 and Reference Example 2.

Further, it can be seen that in the molded articles using the resin compositions of Examples 11 to 17, the appearance of the molded article is superior and the volume average dispersion diameter is small as compared to Comparative Example 3.

On the other hand, in the molded article using the resin composition of Comparative Example 3, a core-shell structure is not formed, and it can be seen that the values of the loss factor at 20° C. and 40° C. are equal to or less than the values of Examples 11 to 17. Further, it can be seen that in Comparative Example 3, the appearance of the molded article is inferior and the volume average dispersion diameter is large as compared to Examples 11 to 17. That is, it can be seen that Comparative Example 3 is inferior to Examples 11 to 17 in dispersibility of the thermoplastic resin (A) in the polar resin (C).

It can be seen from Table 6 that in the molded articles using the resin compositions of Examples 18 and 19, a core-shell structure is formed, and the values of the loss factor at 0° C., 20° C. and 40° C. are equal to or greater than the values of Comparative Example 4 and Reference Example 3.

Further, it can be seen that in the molded articles using the resin compositions of Examples 18 and 19, the appearance of the molded article is superior and the volume average dispersion diameter is small as compared to Comparative Example 4.

On the other hand, in the molded articles using the resin compositions of Comparative Example 4 and Reference Example 3, a core-shell structure is not formed, and it can be seen that the values of the loss factor at 0° C., 20° C. and 40° C. are smaller than the values of Examples 18 and 19. Further, it can be seen that in Comparative Example 4, the appearance of the molded article is inferior and the volume average dispersion diameter is large as compared to Examples 18 and 19. That is, it can be seen that Comparative Example 4 is inferior to Examples 18 and 19 in dispersibility of the thermoplastic resin (A) in the polar resin (C).

It can be seen from Table 7 that in the molded articles using the resin compositions of Examples 20 to 23, a core-shell structure is formed, and the values of the loss factor at 0 to 40° C. are larger than the values of the loss factor at the corresponding temperatures of Reference Example 4, and the values of the loss factor at 10 to 30° C. are particularly large.

Further, it can be seen that in the molded articles using the resin compositions of Examples 20 and 23, the appearance of the molded article is superior and the volume average dispersion diameter is small.

It can be seen from Table 8 that in the molded articles using the resin compositions of Examples 24 to 29, a core-shell structure is formed, the values of the loss factor at 20 to 100° C. are equal to or greater than the values of the loss factor at the corresponding temperatures of Reference Example 5, and the values of the loss factor at 20 to 100° C. of Examples 26 and 27 are equivalent to the loss factor at the corresponding temperatures of Comparative Example 5.

Further, it can be seen that in the molded articles using the resin compositions of Examples 24 and 29, the appearance of the molded article is superior and the volume average dispersion diameter is small as compared to Comparative Example 5.

On the other hand, in the molded article using the resin composition of Comparative Example 5, a core-shell structure is not formed, and the appearance of the molded article is inferior and the volume average dispersion diameter is large as compared to Examples 24 to 29. That is, it can be seen that Comparative Example 5 is inferior to Examples 24 to 29 in dispersibility of the thermoplastic resin (A) in the polar resin (C).

It can be seen from Table 9 that when the resin compositions of Examples 30 to 32 containing the modified resin-3 or the modified resin-4 were used, extrusion processability is good, and a core-shell structure is formed in the molded articles obtained from these resin compositions. Further, it can be seen that the loss factor can be increased in a wide temperature range of 0 to 80° C. as compared with Reference Example 6 made of a PPS resin alone.

On the other hand, it can be seen that the resin composition of Comparative Example 6, which does not contain a modified resin, has low compatibility with a polar resin, so that pellets cannot be obtained, and the loss factor cannot be measured.

INDUSTRIAL APPLICABILITY

Since the resin composition of the present invention exhibits high vibration damping properties even at a relatively high temperature, has good moldability, and is excellent in impact resistance, it can be used for molded bodies, pellets, veils, vibration damping materials, sound insulating materials, compatibilizers, shoe sole materials, flooring materials, adhesives, pressure-sensitive adhesives, laminates, fibers, automobile parts, and the like, which are molded products thereof.

REFERENCE SIGNS LIST 10, 11: Core-shell structure
10a: Core
10b, 11b: Shell
11a, 11c: Domain
20: Matrix

The invention claimed is:

1. A resin composition, comprising:
a thermoplastic resin (A);
a thermoplastic resin (B) different from the thermoplastic resin (A); and
a polar resin (C),
wherein
the thermoplastic resin (A) is a hydrogenated product of a block copolymer consisting of at least one having a block (A-1) containing more than 70 mol % of an aromatic vinyl monomer unit and at least one block (A-2) containing 30 mol % or more of a conjugated diene monomer unit,
the block (A-2) has a hydrogenation rate of 86 to 99 mol %,
the thermoplastic resin (B) has at least one of a reactive functional group and a monomer unit containing a hetero atom, and the thermoplastic resin (B) is a modified product obtained by modifying a block copolymer having a polymer block (B-1) derived from an aromatic vinyl compound and a polymer block (B-2) derived from a conjugated diene compound or a hydrogenated product thereof with a compound having the reactive functional group, or a modified product obtained by modifying an olefin-based resin with a compound having the reactive functional group, and
with respect to the total mass of the resin composition, the content of the thermoplastic resin (A) is 1 to 30% by mass, the content of the thermoplastic resin (B) is 1 to 30% by mass, and the content of the polar resin (C) is 40 to 98% by mass, and
wherein when the resin composition is molded to form an article, the thermoplastic resin (A) and the thermoplastic resin (B) are dispersed in the polar resin (C) as a core-shell structure having a core of the thermoplastic resin (A) and a shell of the thermoplastic resin (B) and a dispersion diameter D(A) of the thermoplastic resin (A) and a dispersion diameter D(B) of the thermoplastic resin (B) satisfy a relationship D(A)<D(B).

2. The resin composition of claim 1, wherein the thermoplastic resin (A) has a glass transition temperature in a range of −30 to +50° C.

3. The resin composition of claim 1, wherein the thermoplastic resin (A) has a structure represented by the following formula (X) or a structure of a hydrogenated product thereof:

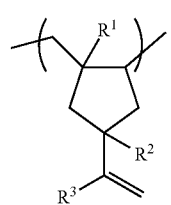

(X)

wherein R¹ to R³ each independently represent a hydrogen atom or a hydrocarbon group having 1 to 11 carbon atoms, and a plurality of R¹ to R³ may be the same or different.

4. The resin composition of claim 1, wherein the thermoplastic resin (A) does not have an alkoxysilyl group, a carboxy group, an amino group, a hydroxy group, an epoxy group, a group derived from an acid anhydride, an ester group, a mercapto group, and an oxazoline group.

5. The resin composition of claim 1, wherein the thermoplastic resin (B) has one or more functional groups selected from the group consisting of an alkoxysilyl group, a carboxy group, an amino group, a hydroxy group, an epoxy group, a group derived from an acid anhydride, an ester group, and an oxazoline group.

6. The resin composition of claim 1, wherein the thermoplastic resin (B) is an epoxy group-containing resin.

7. The resin composition of claim 1, wherein the thermoplastic resin (B) has a group derived from at least one selected from the group consisting of maleic anhydride and an alkoxysilyl group as the reactive functional group.

8. The resin composition according to claim 1, wherein the core-shell structure comprises a core-shell structure including a plurality of domains distributed in an island shape, and the plurality of domains comprise at least one of a domain of the thermoplastic resin (A) and a domain of the polar resin (C).

9. The resin composition of claim 1, wherein at least one of a glass transition temperature and a melting point of the polar resin (C) is 80° C. or higher.

10. The resin composition of claim 1, wherein the polar resin (C) is at least one selected from the group consisting of a polyamide resin, a polyester resin, a polyacetal resin, a polyphenylene sulfide resin, a polyurethane resin, a polyvinyl alcohol resin, and a polycarbonate resin.

11. An automotive member comprising the resin composition of claim 1.

12. A molded article of the resin composition of claim 1.

13. A method for producing the resin composition of claim 1, comprising preparing a mixture of the thermoplastic resin (A) and the thermoplastic resin (B) in a molten state, and mixing the mixture with the polar resin (C).

14. The method for producing a resin composition according to claim 13, further comprising adding a radical initiator to a mixture in a molten state of the thermoplastic resin (A) and a precursor (B0) of the thermoplastic resin (B) satisfying the following conditions (4) and (5) to introduce a reactive functional group into the precursor (B0) to obtain the thermoplastic resin (A) and the thermoplastic resin (B) having the reactive functional group:

(4) the thermoplastic resin (A) is a block copolymer having a block (A-1) containing more than 70 mol % of an aromatic vinyl monomer unit and a block (A-2) containing 30 mol % or more of a conjugated diene monomer, or a hydrogenated product thereof, and has a glass transition temperature in the range of −30 to +50° C.;

(5) the precursor (B0) of the thermoplastic resin (B) has a glass transition temperature in the range of −100 to −31° C.

15. The method for producing a resin composition according to claim 14, wherein the thermoplastic resin (A) is a hydrogenated product of a block copolymer having the block (A-1) and the block (A-2), and the hydrogenated product has a hydrogenation rate of 50 to 99 mol %.

16. The method for producing a resin composition of claim 13, wherein the thermoplastic resin (A) has a structure represented by the following formula (X) or a structure of a hydrogenated product thereof:

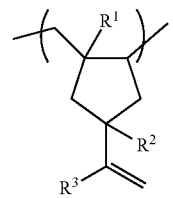

(X)

wherein R¹ to R³ each independently represent a hydrogen atom or a hydrocarbon group having 1 to 11 carbon atoms, and a plurality of R¹ to R³ may be the same or different.

17. The method for producing a resin composition of claim 13, wherein the reactive functional group of the thermoplastic resin (B) is one or two or more functional groups selected from the group consisting of an alkoxysilyl group, an epoxy group, and a group derived from an acid anhydride.

* * * * *